United States Patent
Ruelke et al.

(10) Patent No.: US 12,472,823 B2
(45) Date of Patent: Nov. 18, 2025

(54) DEVICE, SYSTEM, AND METHOD FOR CONTROLLING A VEHICLE DISPLAY AND A MOBILE DISPLAY INTO A THREAT MODE

(71) Applicant: MOTOROLA SOLUTIONS, INC., Chicago, IL (US)

(72) Inventors: Charles R. Ruelke, Coral Springs, FL (US); Kiesha Grant, Sunrise, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 221 days.

(21) Appl. No.: 18/398,615

(22) Filed: Dec. 28, 2023

(65) Prior Publication Data

US 2025/0214440 A1     Jul. 3, 2025

(51) Int. Cl.
*B60K 35/81*     (2024.01)
*B60K 35/215*     (2024.01)
(Continued)

(52) U.S. Cl.
CPC ............ *B60K 35/81* (2024.01); *B60K 35/215* (2024.01); *B60K 35/22* (2024.01); *B60K 35/28* (2024.01); *B60K 35/29* (2024.01); *B60K 2360/119* (2024.01); *B60K 2360/166* (2024.01); *B60K 2360/167* (2024.01); *B60K 2360/176* (2024.01); *B60K 2360/178* (2024.01);
(Continued)

(58) Field of Classification Search
CPC ...... B60K 35/81; B60K 35/215; B60K 35/28; B60K 35/29; B60K 35/22; B60K 2360/195; B60K 2360/178; B60K 2360/166; B60K 2360/176; B60K 2360/167; B60K 2360/731; B60K 2360/186; B60K 2360/119
See application file for complete search history.

(56) References Cited

U.S. PATENT DOCUMENTS

| | | |
|---|---|---|
| 9,088,572 B2 | 7/2015 | Ricci |
| 9,615,350 B2 * | 4/2017 | Malahy ............... H04M 1/6075 |

(Continued)

FOREIGN PATENT DOCUMENTS

| | | | | |
|---|---|---|---|---|
| CN | 117681654 A | * | 3/2024 | ........... B60R 16/023 |
| GB | 2558715 A | * | 7/2018 | ........... G06V 10/809 |

(Continued)

*Primary Examiner* — Chico A Foxx
(74) *Attorney, Agent, or Firm* — PERRY + CURRIER INC.

(57) ABSTRACT

A device, system, and method for controlling a vehicle display and a mobile display into a threat mode is provided. A system comprises a vehicle display of a vehicle; and a mobile device communicatively coupled to the vehicle, the mobile device comprising: a mobile display. The system further comprises a controller that determines a threat associated with the vehicle; and a threat type; and in response to determining the threat, controls the vehicle display and the mobile display to switch to a threat mode by: controlling the vehicle display to: provide one or more graphical threat indications indicating one or more of: the threat; and the threat type; and controls the mobile display to: provide one or more threat-related applications associated with the threat, that may be for one or more of interacting with, and modifying, one or more graphical threat indications at the vehicle display.

20 Claims, 7 Drawing Sheets

(51) Int. Cl.
*B60K 35/22* (2024.01)
*B60K 35/28* (2024.01)
*B60K 35/29* (2024.01)

(52) U.S. Cl.
CPC .. *B60K 2360/186* (2024.01); *B60K 2360/195* (2024.01); *B60K 2360/731* (2024.01)

(56) References Cited

U.S. PATENT DOCUMENTS

| | | | |
|---|---|---|---|
| 10,421,437 B1 | 9/2019 | Koskan | |
| 11,651,692 B2 | 5/2023 | Petit et al. | |
| 11,685,394 B2 * | 6/2023 | Schumacher | G08G 1/167 340/961 |
| 12,183,191 B2 * | 12/2024 | Salter | G08G 1/0133 |
| 2005/0073438 A1 * | 4/2005 | Rodgers | G08G 1/161 340/944 |
| 2012/0093357 A1 * | 4/2012 | Seder | B60W 30/095 382/103 |
| 2017/0155749 A1 * | 6/2017 | Ranganathan | H04M 1/6075 |
| 2020/0326704 A1 * | 10/2020 | Blanco | G05D 1/0088 |
| 2020/0371196 A1 * | 11/2020 | Blanco | B60Q 5/005 |
| 2021/0291849 A1 | 9/2021 | Meng | |
| 2022/0189307 A1 | 6/2022 | Shmueli Friedland et al. | |
| 2022/0322086 A1 * | 10/2022 | Kerning | H04L 63/102 |
| 2023/0228578 A1 * | 7/2023 | Shields | G06N 20/00 701/414 |
| 2024/0388915 A1 * | 11/2024 | Shuman | H04W 12/121 |
| 2025/0068771 A1 | 2/2025 | Ruelke et al. | |

FOREIGN PATENT DOCUMENTS

| | | | | |
|---|---|---|---|---|
| JP | 2014227122 A | * | 12/2014 | |
| WO | WO-2023049382 A1 | * | 3/2023 | ........... H04N 21/812 |
| WO | WO-2024238676 A1 | * | 11/2024 | .............. H04W 4/02 |

\* cited by examiner

DEVICE, SYSTEM, AND METHOD FOR CONTROLLING A VEHICLE DISPLAY AND A MOBILE DISPLAY INTO A THREAT MODE

BACKGROUND OF THE INVENTION

In first responder environments, functionality provided at vehicles may be important for first responders to manage an incident (e.g., a threat). Such functionality may be provided at a respective mobile device display and/or a respective vehicle display of the vehicles or a combination thereof; however such dual display presentations tend to mirror each other, and/or tend to have disconnected and/or uncoordinated functionality. This lack of coordination of information between the different displays may induce a waste of processing resources, bandwidth resources, a waste of display space and/or an opportunity to add additional useful technical functionality.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
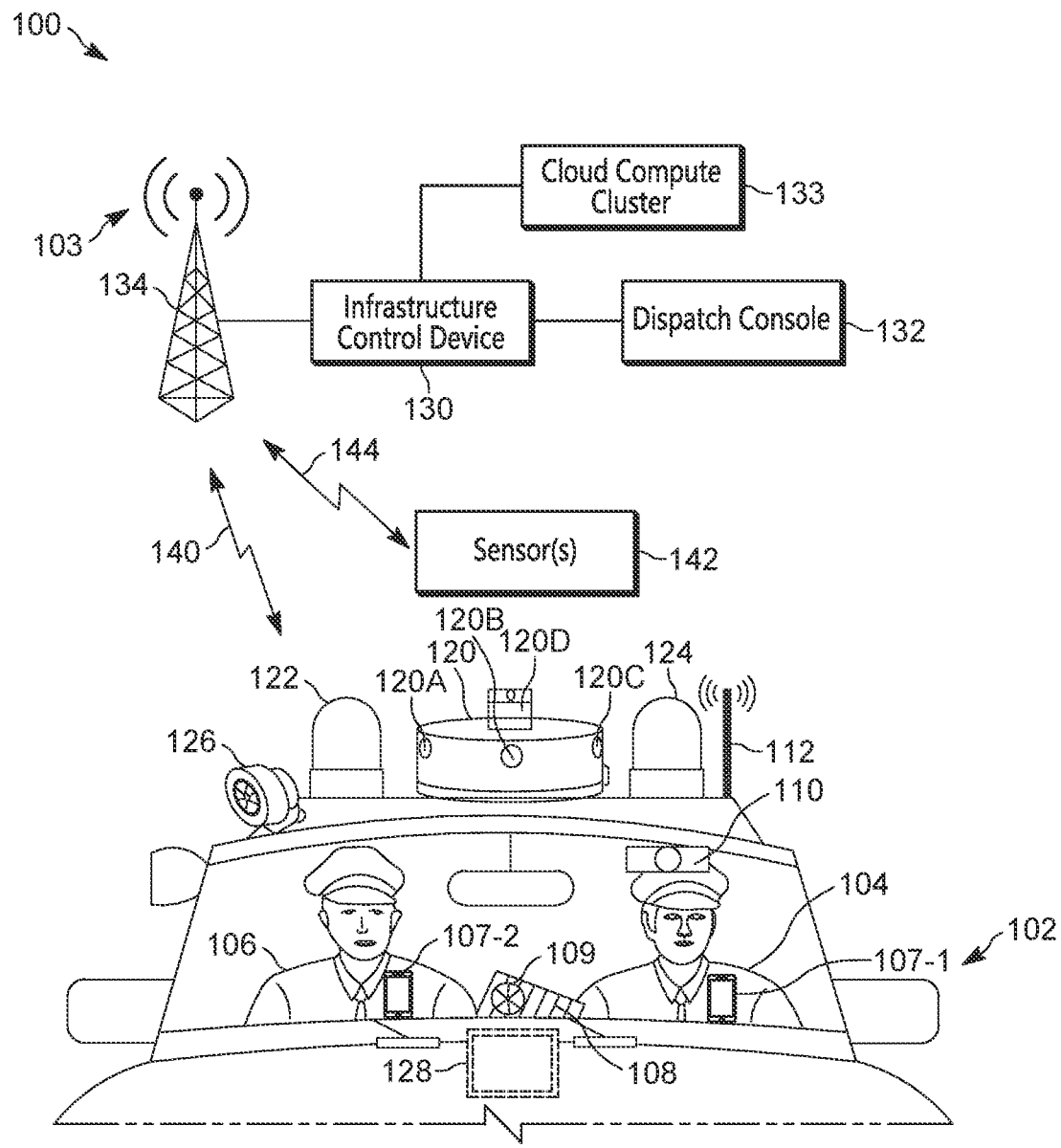
FIG. 1A depicts a system for controlling a vehicle display and a mobile display into a threat mode, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In first responder environments, functionality provided at vehicle-related displays may be important for responding to and/or managing threats, and the like. For example, when threats are detected at or around a vehicle, it is important to provide the first responders with electronic and coordinated functionality for responding to the threat. Indeed, providing such electronic and coordinated functionality is a significant technical problem. While in some applications, such as Apple CarPlay™ or Android Auto™, a mobile device may control a vehicle display, such control is limited and is generally not sufficient to provide the aforementioned electronic and coordinated functionality when responding to and/or managing threats. Thus, there exists a need for an improved technical method, device, and system for controlling a vehicle display and a mobile display into a threat mode.

Hence, provided herein is a device, system, and method for controlling a vehicle display and a mobile display into a threat mode. The system comprises vehicle (e.g., a police car, a fire truck, an ambulance, a security guard vehicle, amongst other possibilities, and the like), and the vehicle generally comprises a vehicle display, for example integrated into a dashboard of the vehicle. The system further comprises a mobile device that includes a mobile display, which may be located in the vehicle, and/or which may be carried outside the vehicle. Regardless, the vehicle and the mobile device are communicatively coupled to each other.

The system further comprises a vehicle sensor cluster which is generally configured to detect threats, for example around the vehicle, and within a perimeter of the vehicle; such a vehicle sensor cluster may be mounted on a roof of the vehicle, and/or distributed about the vehicle. In some examples, the system may further comprise sensors external to the vehicle which may assist at detecting threats.

The system further comprises a controller (e.g., a processor, and the like) that may be a component of the mobile device and/or a vehicle computer and/or another computing device of the system, such as a cloud computing device.

The controller may generally determine, using sensor data from the vehicle sensor cluster: a threat associated with the vehicle; and a threat type. The controller may, in response to determining the threat, control the vehicle display and the mobile display to switch to a threat mode. For example, in the threat mode, the vehicle display may be controlled to provide one or more graphical threat indications indicating one or more of: the threat; and the threat type. Such graphical threat indications may be active or passive; for example, a passive graphical threat indication may provide information associated with the threat, while an active graphical threat indication may be interactive to provide further information associated with the threat upon actuation. Similarly, in the threat mode, the mobile display may be controlled to provide one or more threat-related applications associated with the threat, one or more threat-related applications for one or more of interacting with, and modifying, at least one of the one or more graphical threat indications at the vehicle display. Furthermore, the graphical threat indications and/or the one or more threat-related applications may comprise an actionable response component, which may indicate and/or initiate responses to the threat that may be initiated and/or may have already been automatically initiated, and which may be based on the threat type. As such, the vehicle display and the mobile display in the threat mode provide electronic and coordinated functionality to assist first responders with responding to the threat.

An aspect of the present specification provides a system comprising: a vehicle display of a vehicle; and a mobile device communicatively coupled to the vehicle, the mobile device comprising: a mobile display; and a controller configured to: determine a threat associated with the vehicle; and a threat type; and in response to determining the threat, control the vehicle display and the mobile display to switch to a threat mode by: controlling the vehicle display to: provide one or more graphical threat indications indicating one or more of: the threat; and the threat type; and controlling the mobile display to: provide one or more threat-related applications associated with the threat, at least one of the one or more threat-related applications for one or more of interacting with, and modifying, at least one of the one or more graphical threat indications at the vehicle display.

Another aspect of the present specification provides a method comprising: determining, via a computing device, a threat associated with a vehicle; and a threat type; and in response to determining the threat, controlling, via the computing device, a vehicle display, of the vehicle, and a mobile display, of a mobile device communicatively coupled to the vehicle, to switch to a threat mode by: controlling the vehicle display to: provide one or more graphical threat indications indicating one or more of: the threat; and the threat type; and controlling the mobile display to: provide one or more threat-related applications associated with the threat, at least one of the one or more threat-related applications for one or more of interacting with, and modifying, at least one of the one or more graphical threat indications at the vehicle display.

Each of the above-mentioned aspects will be discussed in more detail below, starting with an example system and device architectures of the system, in which the embodiments may be practiced, followed by an illustration of processing blocks for achieving an improved technical method, device, and system for controlling a vehicle display and a mobile display into a threat mode.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and, likewise, various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions, which execute on the computer or other programmable apparatus, provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the drawings.

Referring now to the drawings, and in particular FIG. 1A, an example communication system diagram illustrates a system 100 including a vehicle 102 and an example wireless infrastructure radio access network (RAN) 103. The vehicle 102 is illustrated with two vehicle occupants including a first officer 104 driver and a second officer 106 passenger. The officers 104, 106 generally operate one or more mobile devices 107-1, 107-2 (e.g., interchangeably referred to hereafter collectively as the mobile devices 107 and, generically, as a mobile device 107; this convention will be used elsewhere in the present application). For example the first officer 104 operates the first mobile device 107-1 and the second officer 106 operates the second mobile device 107-2. The mobile devices 107 may comprise any suitable type of mobile devices, with respective display screens and respective input devices, as described in more detail herein.

While the officers 104, 106 are depicted as police officers, the officers 104, 106 may comprise any suitable type of first responder, or enterprise business responders rendering public assistance or providing enterprise security, that may include, but is not limited to, the depicted police officers, firefighters, emergency medical technicians, security contractors, and the like. Similarly, while the vehicle 102 is depicted as a police car, the vehicle 102 may comprise any suitable type of vehicle that may be operated by first responders, and the like (e.g., a police vehicle, a fire truck, an ambulance, a security guard vehicle, delivery trucks and/or armored vehicles that are "dispatched" to locations amongst other possibilities, and the like).

The vehicle 102 is further equipped with a vehicular computing device 108, an internal speaker 109, a driver's head and/or eye-tracking device 110, an antenna 112 communicatively coupled to a transceiver at the vehicular computing device 108 for communicating with other computing devices in an ad-hoc manner or in an infrastructure manner via the RAN 103, a vehicle sensor cluster 120 for detecting threats in a 360 field-of-view in an area surrounding the vehicle 102 and for detecting approaching threats, external lights 122 and 124, and an external speaker 126. While examples are described herein with respect to the vehicle sensor cluster 120, the vehicle sensor cluster 120 may be optional.

The vehicle 102 may be a human-operable vehicle, or may be a partially or fully self-driving vehicle operable under control of the vehicular computing device 108 for example in cooperation with the vehicle sensor cluster 120 (which may include any suitable sensors, including, but not limited to, one or more of visible-light camera(s), infrared light camera(s), time-of-flight depth camera(s), radio wave emission and detection (such as radio direction and distancing (RADAR) or sound navigation and ranging (SONAR)) device(s), and/or light detection and ranging (LiDAR) device(s) for self-driving purposes and/or for the other purposes as set forth herein, including, but not limited to, detecting threats associated with the vehicle 102).

The vehicle 102 may include a location (and/or orientation) determination device integrated with or separately disposed in the vehicular computing device 108 and/or an antenna 112 or associated transceiver for determining (and storing and/or transmitting) a location (and/or orientation) of the vehicle 102. The vehicular computing device 108 may further contain a mapping and routing application that may provide an input interface (touch, keyboard, voice, wireless transceiver, etc.) for a user such as the first officer 104 to enter an intended destination or assigned incident location for the vehicle 102, and after which may provide directions to the first officer 104 to move the vehicle to the intended destination or assigned incident location or may control the vehicle 102, for example in cooperation with the vehicle sensor cluster 120, to actually move the vehicle 102 to the intended destination or assigned incident location.

In particular, as depicted, the vehicle 102 comprises a vehicle display 128, which may be integrated into a dashboard of the vehicle 102. As the dashboard is not visible in FIG. 1A, the vehicle display 128 is depicted in broken lines to indicate that the vehicle display 128 is integrated into the dashboard of the vehicle 102 in particular examples. Alternatively, the vehicle display 128 may be located internal to the vehicle in any location as appropriate for a particular application as may determined by human factor design requirements, such as rear seat monitoring, and/or drop-down display in fire vehicles, and the like.

The first officer 104 is illustrated in FIG. 1A as an officer (e.g., such as a police officer), but in other embodiments, may be any type of vehicle occupant, including one that may drive the vehicle to a particular intended destination or assigned incident location, or may enter an intended destination or assigned incident location into the vehicular computing device 108 prior to physically driving to the intended destination or assigned incident location. For example, first officer 104 may, in other embodiments, work for other governmental and non-governmental agencies such as park districts, real estate offices, or other types of security details. Similar considerations may be applied to the second officer 106.

The mobile devices 107, may comprise any suitable devices capable of communicating via short-range and/or long-range wireless communication links with the vehicular computing device 108, with each other, and/or with an infrastructure control device 130 via the RAN 103, among other possibilities. In particular, a mobile device 107 may be paired with the vehicular computing device 108, for example to enable coordination of functionality provided at a display screen (e.g., a mobile display) of the mobile device 107 and the vehicle display 128.

Each of the mobile devices 107 may be any mobile computing device used for infrastructure RAN or direct-mode media (e.g., voice, audio, video, etc.) communication via a long-range wireless transmitter and/or transceiver that has a transmitter transmit range on the order of miles (e.g., 0.5-50 miles, or 3-20 miles and in comparison to a short-range transmitter such as a Bluetooth, Zigbee, or NFC transmitter) with other mobile computing devices and/or the infrastructure RAN 103. The long-range transmitter may implement a direct-mode, conventional, or trunked land mobile radio (LMR) standard or protocol such as ETSI Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, the long range transmitter may implement a Long Term Evolution (LTE), LTE-Advance, or 5G protocol including multimedia broadcast multicast services (MBMS) or single site point-to-multipoint (SC-PTM) over which an open mobile alliance (OMA) push to talk (PTT) over cellular (OMA-PoC), a voice over IP (VOIP), an LTE Direct or LTE Device to Device, or a PTT over IP (PoIP) application may be implemented. In still further examples, the long range transmitter may operate according to a 3GPP (3rd Generation Partnership Project) 4G LTE (Long-Term Evolution) standard, a 3GPP 5G standard (e.g., a network architecture compliant with, for example, the 3GPP TS 23 specification series and/or a new radio (NR) air interface compliant with the 3GPP TS 38 specification series) standard other types of GSM (Global System for Mobile communications) and/or another similar type of wireless standard. In still further embodiments, the long-range transmitter may implement a Wi-Fi protocol for example in accordance with an IEEE 802.11 standard (e.g., 802.11a, 802.11b, 802.11g) or a WiMAX protocol for example operating in accordance with an IEEE 802.16 standard.

In addition to or as an alternative to the long-range transmitter or transceiver, each mobile device 107 may further contain a short-range transmitter or transceiver that has a transmitter transmit range on the order of meters (e.g., such as a Bluetooth, Zigbee, or NFC connection having a transmit range on the order of 0.01-100 meters, or 0.1-10 meters) for communicating with each other or with other computing devices such as vehicular computing device 108. Each mobile device 107 may further contain one or more physical electronic ports (such as a USB port, an Ethernet port, an audio jack, etc.) for direct electronic coupling with other computing devices such as vehicular computing device 108 or for coupling with other accessories such as a radio speaker microphone (RSM).

Each mobile device 107 may additionally contain a push to talk (PTT) button that enables transmission of voice audio captured at a microphone of the mobile device 107 to be transmitted via its short-range or long-range transceiver to other radio communication devices or to other computing devices such as a dispatch console 132 via the RAN 103, and enables reception of voice audio (when not depressed) received at the radio communication device via its long-range or short-range receiver and played back via a speaker of the radio communication device. In those examples where the radio communication device is a full-duplex device, instead of a half-duplex device, depression of the PTT button may allow simultaneous transmission and reception of voice audio, instead of mere reception, among other communication media types such as video.

Figure 1B:
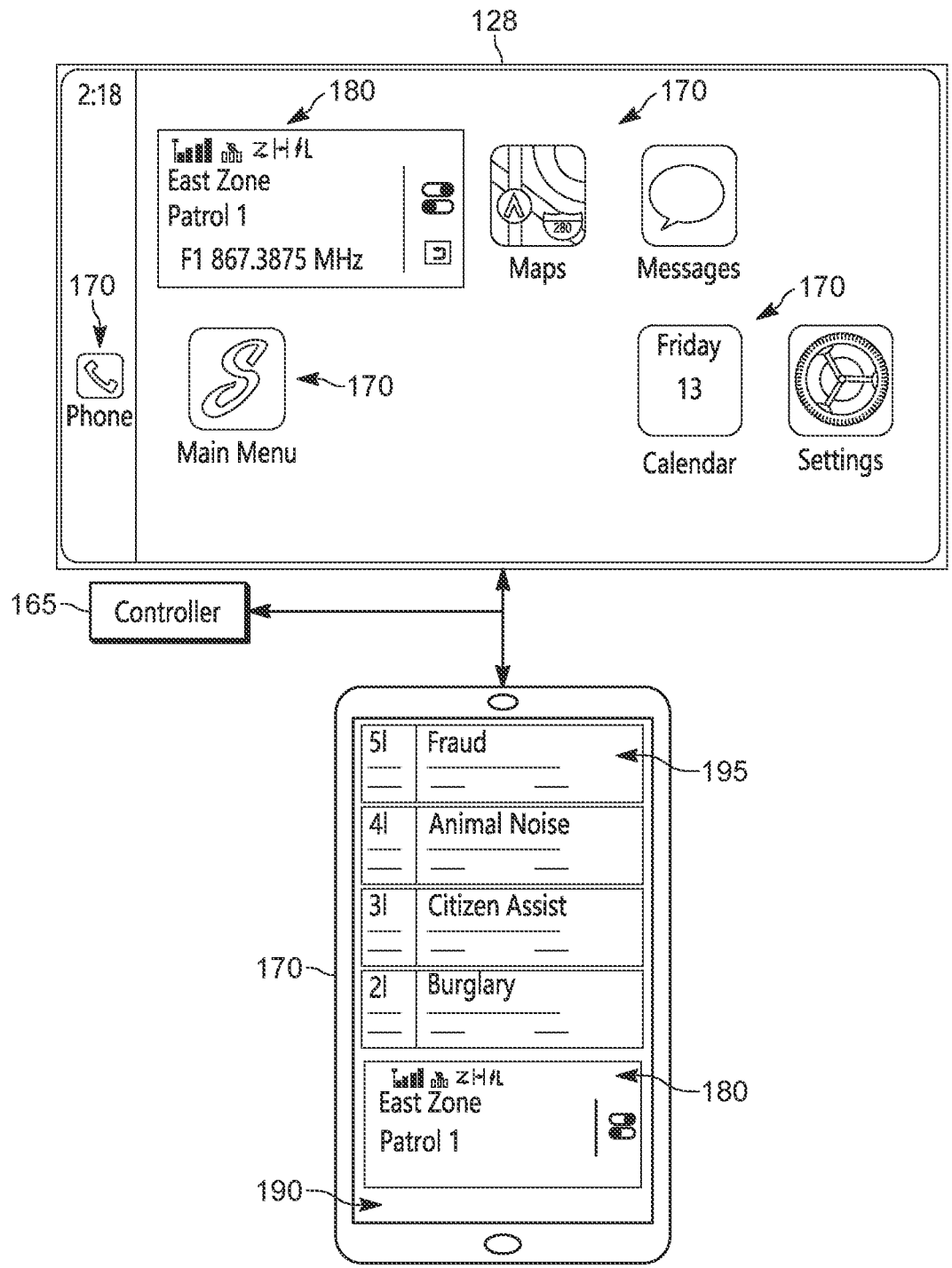
FIG. 1B depicts the vehicle display and the mobile display of the system of FIG. 1A in a non-threat, in accordance with some examples.

As has already been described, a mobile device 107 may further include a display screen (e.g., as depicted in FIG. 1B) for displaying graphics, applications, images, video, and/or text to the users/officers 104, 106 or to someone else. Such a display screen may be, for example, a liquid crystal display (LCD) screen or an organic light emitting display (OLED) display screen. In some examples, a touch sensitive input interface may be incorporated into the display screen as well, allowing the users/officers 104, 106 to interact with content provided on the display screen.

A soft PTT input may also be provided, for example, such as via a touch-screen interface. Furthermore, a video camera may be provided at each mobile device 107, integrating an ability to capture images and/or video and store the captured image data (for further analysis) or transmit the captured image data as an image or video stream to the vehicular computing device 108, to other radio communication devices, and/or to other computing devices via RAN 103.

The vehicular computing device 108 may be any computing device specifically adapted for operation within the vehicle 102, and may include, for example, a vehicular console computing device, a tablet computing device, a laptop computing device, or some other computing device commensurate with the rest of the present specification, and may contain many or all of the same or similar features as set forth above with respect to mobile devices 107.

The vehicular computing device 108 may comprise an in-dash and/or on-board computing device and/or at least a portion of the vehicular computing device 108 may be external to a dashboard, and the like.

In some examples, the vehicular computing device 108 may form a hub of communication connectivity for one or more of the associated mobile device 107, the driver's head and/or eye-tracking device 110, the vehicle sensor cluster 120, the external lights 122, 124, and the speakers 109, 126, each of which may be communicatively coupled to the vehicular computing device 108 via one or both of a wired communication link and a short-range wireless communication link. The vehicular computing device 108 may further include or have access to a transceiver and may be coupled to the antenna 112 and through which the vehicular computing device 108 itself and the above-mentioned other devices may further communicate with or be accessed by a long-range wireless communication link with RAN 103, such as via LTE or LMR.

The internal speaker 109 may be an audio output-device communicatively coupled to the vehicular computing device 108, and alternatively indirectly paired to one or both of the mobile devices 107 (e.g., via the vehicular computing device 108), for playing back audio such as a public safety tone, series of tones, or spoken words that may then be perceived by occupants within the vehicle such as the first officer 104 and/or the second officer 106. In some examples, the speaker 109 may be replaced with a plurality of speakers displaced throughout the internal cabin of the vehicle 102 and selectively enabled in accordance with a detected breach of a vehicular geofence surrounding the vehicle such that a particular one of the plurality of speakers closest to the breach is selected to playback the tone, spoken notification, or other type of speech output to indicate a relative direction of the breach.

The driver's head and/or eye-tracking device 110 may be any optical and/or mechanical system for identifying and determining a direction of intent of the first officer 104 with respect to one or both of a first video recording trigger and a second video recording trigger and for providing head and/or gaze direction information in one or more electronic messages to another computing device for further processing, such as the vehicular computing device 108 or the vehicle sensor cluster 120, and/or to remote computing device such as the infrastructure control device 130 via the RAN 103, among other possibilities.

For example, and as illustrated in FIG. 1A, the driver's head and/or eye-tracking device 110 may be a rear-facing (in relation to the rear of the car) optical recording device that is capable of tracking a location of the driver's head and/or eye gaze and determining, based on the optical tracking, a direction in which the first officer 104 is looking (where 0° is directly forward and out of the page in the figure and where 90° is tangentially to the first officer's 104 left in a direction opposite the direction of second officer 106). For example, the rear-facing camera may optically track the first officer's 104 gaze using infrared light reflections to track movements in a center of the pupil, front of the cornea, and/or back of the lens, or by tracking movements in detected retinal blood vessels. In other examples, the rear-facing camera may use face-detection on captured 2D images to detect a direction in which the first officer's 104 face is directed. Still further, a depth camera may use face detection on captured 3D depth images to detect a direction in which the first officer's 104 face is directed. Other possibilities for optical tracking exist as well.

The vehicle sensor cluster 120 may comprise a communicatively coupled set of one or more sensors and/or devices, and/or electronic ranging sensors and/or devices, that may include one or more capture-only devices and/or one or more emit and capture devices. Regardless, the sensors and/or devices, and/or electronic ranging sensors and/or devices are understood to acquire sensor data that may be used to detect threats and threat types associated with the vehicle 102 (e.g., as described at least with respect to FIG. 4A and FIG. 4B).

More specifically, vehicle sensor cluster 120 may include, but is not limited to, one or more of visible-light capture camera(s), infrared capture camera(s), time-of-flight depth camera(s), radio wave distancing device(s), and/or light detection and ranging (LiDAR) device(s), among other possibilities. The vehicle sensor cluster 120 may be physically coupled to the vehicle 102, such as centrally positioned atop the vehicle 102 as illustrated in FIG. 1A, or in other examples, may be distributed amongst various satellite locations around the vehicle, and wiredly or wirelessly coupled to a centralized processing device such as an enclosure same or similar to that illustrated in FIG. 1A, and which may include, but is not limited to, vehicular computing device 108, or another computing device associated with the vehicle 102, amongst other possibilities. When disposed in a distributed fashion, portions of the vehicle sensor cluster 120 may be disposed in other parts of the vehicle 102, such as in the external lights 122 and 124 (which in other examples not illustrated may take the form of an elongated light bar positioned atop the vehicle 102), within one or more side or rear view mirrors, integrated into a rear-view camera, or other locations or devices distributed across the internal or external portions of the vehicle 102 and having a view surrounding the vehicle 102.

The vehicle sensor cluster 120 is configured, by itself or in cooperation with the vehicular computing device 108, or another computing device associated with the vehicle 102, to detect a threat associated with the vehicle, which may be in the form of a breach of vehicular geofence surrounding the vehicle. Such mobile device controllers may interface with the sensor cluster 120 through near-field and/or WiFi™ communication links, and the like. In this configuration, a controller of a mobile device 107 may be configured to operate as a "primary controller" in priority relative to the vehicular computing device 108, while the vehicular computing device 108 may operate as a subordinate and/or secondary computing resource to the controller of a mobile device 107. A computing device controlling the sensor cluster 120 may operate to prioritize sensor information from the sensor cluster 120 based on a particular user profile of a given mobile device 107-1, 107-2. For example, a mobile device user profile associated with the mobile device 107-1 (e.g., and which may be stored at the mobile device 107-1) may include information specific to the user 104 and a mobile device user profile associated with the mobile device 107-2 (e.g., and which may be stored at the mobile device 107-2) may include information specific to the user 106. In this way, sensor information from the sensor cluster 120 may be prioritized based on the specific user profiles, and/or such user profiles may indicate authorization to access certain information, and and/or such user profiles may be used to assigned responsibilities to the users 104, 106, for example based on the sensor information from the sensor cluster 120.

The vehicle sensor cluster 120 may be continuously on and leveraging its sensors and/or devices, and/or electronic ranging sensors and/or devices, to detect a breach of the vehicular geofence surrounding the vehicle, or the vehicle sensor cluster 120 may only periodically be turned on at a regular or semi-regular cadence to detect whether any breaches of the vehicular geofence surrounding the vehicle have occurred, or may be triggered to begin scanning for breaches of the vehicular geofence surrounding the vehicle upon occurrence of some other trigger detected at the vehicle sensor cluster 120 or vehicular computing device 108, or upon receipt of an instruction from, for example, the vehicular computing device 108 or the RAN 103, among other possibilities.

The one or more sensors and/or devices, and/or electronic ranging sensors and/or devices, may comprise a single scanning device having a field of view of less than 360° and that is then caused to rotate and scan at a particular frequency, such as rotating 1-10 times per second to create a 360° field of view of the area surrounding the vehicle sensor cluster 120 and thus the vehicle 102 to which it is attached. In other examples, a plurality of range detection devices, each having a field of view less than 360°, may be statically placed around the vehicle sensor cluster 120 or in a distributed manner around the vehicle 102 as set forth earlier, to altogether enable a 360° field of view of the area surrounding the vehicle sensor cluster 120 and thus the vehicle 102 to which it is attached. In still other examples, and for both visible or infrared light imaging systems and radio-wave imaging systems, complex optics and/or waveguides may be used to enable capture of a 360° field of view in a single static light imaging or radio wave detection sensor, for example, after which image processing or radiometry processing algorithms may be used to de-warp or otherwise compensate for distortions introduced into the captured data by the optics and/or waveguides, as necessary. As just one example, and as illustrated in FIG. 1A, the vehicle sensor cluster 120 may include one or more static visible light imaging devices 120A-C each having an approximate 90 field of view (and further including a fourth imaging device facing backwards and not illustrated in FIG. 1A) that may be combined optically or digitally at the vehicle sensor cluster 120 or the vehicular computing device 108 to provide visible-light imaging functionality across a 360 field-of-view, and may further include an active scanning RADAR emitter and detector 120D positioned above the visible light imaging devices 120A-C to provide both light-imaging and radio wave reflection range detection capabilities. Indeed, such both light-imaging and radio wave reflection range detection capabilities may enable both detection of a threat and a threat type, for example to detect not only a weapon, but a type of a weapon that may at least partially constitute the threat. Other arrangements and combinations are possible as well.

Data produced by the sensors and/or devices may then be used at the vehicle sensor cluster 120 and/or the vehicular computing device 108, and/or another computing device associated with the vehicle 102, to determine a range (relative to the vehicle 102) of one or more objects approaching the vehicle, for example in addition to other characteristics of the approaching object, including but not limited to, a cross-sectional shape, an initial position, a current position, a velocity, an acceleration, a bearing, and/or a size (length, width, and/or height) of the object. The vehicle sensor cluster 120 and/or the vehicular computing device 108, and/or another computing device associated with the vehicle 102, may also then use the characteristics to predict a future location, path, trajectory, or status of the object. Such characteristics may additionally or alternatively be used to classify the object as a person (including type of person such as adult or child), vehicle (including type of vehicle such as car, motorcycle, or airborne drone), animal (including type of animal such as cat or dog), or other type of object. Such characteristics, predictions, and classifications may be stored in a memory at the vehicle sensor cluster 120 and/or the vehicular computing device 108, and/or another computing device associated with the vehicle 102, accompanying or separate from an image, point cloud, or echo map illustrative of the object or objects detected by the electronic ranging sensors and/or devices. The characteristics, predictions, and classifications and/or the image, point cloud, or echo maps may be stored at the vehicle sensor cluster 120 and/or the vehicular computing device 108, and/or another computing device associated with the vehicle 102, and/or may be transmitted to a separate storage or processing device (such as the infrastructure control device 130, a dispatch console 132, or a cloud compute cluster 133) via infrastructure RAN 103, among other possibilities.

Each of the sensors and/or devices may have an associated ranging function associated with it for determining an approximate range of a detected object from the vehicle sensor cluster 120 and thus the vehicle 102. For example, for visible light or infrared light imaging devices incorporated into vehicle sensor cluster 120, pre-configured portions of the captured image frames may be associated with particular distances. For example, a lower quarter of the frame, for example identified via pixel count, may be associated with a distance of 5-10 m (or 7 m) from the vehicle, while a second quarter of the frame may be associated with a distance of 10-20 m (or 15 m) from the vehicle, and a remainder of the frame associated with indeterminate distances or above-horizon distances. Such mappings between frame portions and distances may be varied based on parameters such as pan, tilt, zoom settings (if any) of the imaging cameras, a detected orientation of the vehicle 102 and/or the vehicle sensor cluster 120 beyond level, or other detected variations. In still other examples, direct mappings may not be used, but instead, analytics applied to capture images that use known or learned sizes of known or learned objects detected in the frame to calculate relative distances from the vehicle 102 or the vehicle sensor cluster 120 to detected objects. For example, other vehicles or other people captured in the frame may be compared to known or average sizes of such objects to then infer a distance in the image to a particular detected object. Other methods of determining a distance to an object in a captured image could be used as well. On the other hand, for emission and detection systems such as LiDAR and RADAR, time of flight information measured from the time of emission to the time of detection, and knowledge/pre-configuration of the speed of such emissions through air, may be used to directly calculate an estimated distance from the vehicle 102 or the vehicle sensor cluster 120 to detected objects.

The external lights 122, 124 may be any type of externally-perceivable visible lights and may include an underlying LED, incandescent, and/or halogen lamp whose light output is constant and unidirectional or which may be modulated into a strobe, directional rotating, blinking, or otherwise non-static and/or focused output, and may comprise a white or colored (e.g., red, blue, etc.) light. While the external lights 122, 124 are depicted in FIG. 1A as separately placed individual lights, in other examples, light bars that span substantially the entire width of the roof of the vehicle 102 with a number of same or different sized and/or colored lights in various matrix arrays may be included as well.

The external speaker 126 is a speaker, or a combination of speakers, such as a horn or siren, including an amplifier that may broadcast an externally-perceivable audio output such as a public safety tone, series of tones, or spoken words that may be perceived by other officers, civilians, or suspects nearby while outside of the vehicle 102.

The infrastructure RAN 103 may implement over wireless link(s) 140 a narrowband wireless system such as a conventional or trunked LMR standard or protocol, which may include an ETSI DMR, a P25 standard defined by the APCO, TETRA, or other LMR radio protocols or standards. In other examples, infrastructure RAN 103 may additionally or alternatively implement over wireless link(s) 140 a broadband wireless system such as an LTE protocol including MBMS, an OMA-PoC standard, a VoIP standard, or a PoIP standard. 4G and/or 5G protocols may also be used. In still further examples, infrastructure RAN 103 may additionally or alternatively implement over wireless link(s) 140 a Wi-Fi protocol for example in accordance with an IEEE 802.11 standard (e.g., 802.11a, 802.11b, 802.11g) or a WiMAX protocol for example operating in accordance with an IEEE 802.16 standard. Other types of wireless protocols could be implemented as well.

The infrastructure RAN 103 is illustrated in FIG. 1A as providing coverage for the vehicle 102 and its occupants via a fixed terminal 134 (e.g., a wireless radio tower, and the like) coupled to the infrastructure control device 130 (e.g., a radio controller, call controller, PTT server, zone controller, MME, BSC, MSC, site controller, Push-to-Talk controller, or other network device) and may including the dispatch console 132 operated by a dispatcher. The dispatch console 132 and/or the cloud compute cluster may include a computing device and/or server, and/or may comprise a dispatch server. In other examples, more or different types of fixed terminals may provide RAN services to the vehicle 102 and its vehicle occupants and may or may not contain a separate infrastructure control device 130 and/or dispatch console 132.

The dispatch console 132 may be used to communicate an alert signal to mobile devices 107 or the vehicular computer 108 of an incident or work assignment that warrants a response by individuals 104, 106. An incident alert, or dispatch alert, may be manually or automatically initiated, and may be prioritized so as to indicate severity of associated incident event. An incident alert may also include appropriate information not readily available to the sensor cluster 120, including a threat type, a best route to an incident, individual names and relationships of persons currently at the incident, and backup status of other first responders and/or vehicles that may have also been dispatched to a same incident event.

Wireless communication protocols governing the communication link between the base station 134 and mobile devices 107 and/or the vehicle 102 may include any wide-area coverage system including, but not limited to, legacy FM, APCO, Tetra, LTE, CDMA or 2G, 3G, 4G, 5G cellular or any combination thereof, for example in accordance with transceivers of the base station 134, the mobile devices 107 and/or the vehicle 102.

The infrastructure control device 130 illustrated in FIG. 1A, or some other backend electronic computing device existing on-premises or in the remote cloud compute cluster 133 accessible via an IP network (such as the Internet), may additionally or alternatively operate as a back-end electronic digital assistant, a back-end audio and/or video processing electronic computing device, and/or a remote cloud-based storage device consistent with the remainder of this disclosure.

As depicted, the system 100 may further comprise one or more sensors 142 external the vehicle 102, and the one or more sensors 142 is depicted as being in communication with the vehicle 102 and/or the mobile devices 107 and/or the cloud dispatch console 132 (e.g., a dispatch server) and/or the cloud compute cluster 133 (e.g., a dispatch server) via the terminal 134 (and/or another terminal) and respective wireless link(s) 144, which may be implemented in a similar manner to the wireless link(s) 140. The one or more sensors 142 may be similar to, or different from the sensors of the vehicle sensor cluster 120 and, in a particular example, may include, but is not limited to, one or more cameras and/or video cameras proximal the vehicle 102. Put another way, the one or more sensors 142 may include one or more cameras and/or video cameras located such that an exterior of the vehicle 102 is in a field of view of the one or more cameras and/or video cameras. As such, images and/or video from the one or more cameras and/or video cameras may be used to assist in determining threats associated with the vehicle 102.

Figure 2:
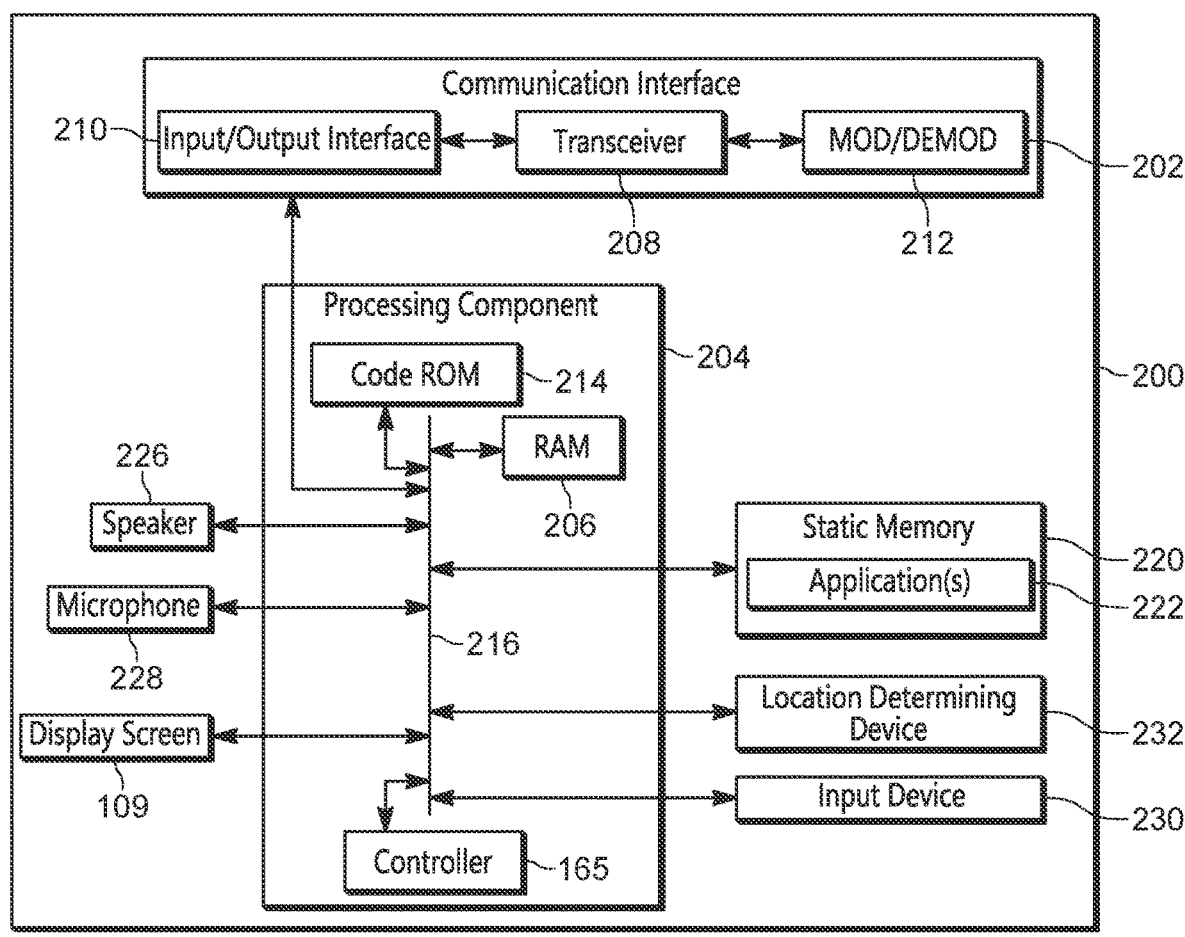
FIG. 2 is a device diagram showing a device structure of a computing device for controlling a vehicle display and a mobile display into a threat mode, in accordance with some examples.

Attention is next directed to FIG. 1B which depicts graphic user interfaces for a mobile device 107 and the vehicle display 128 in a non-threat mode (e.g., prior to a threat being detected via the vehicle sensor cluster 120 and/or via an incident and/or dispatch alert), and being controlled by a controller 165, such as a processor, a microprocessor, and the like, and described in more detail with respect to FIG. 2. The controller 165 may be a component of the mobile device 107, the vehicular computing device 108, or another computing device, internal or external to the vehicle 102 (such as a computing device of the cloud computing cluster 133).

In general, the mobile device 107 and the vehicle 102 are understood to be communicatively coupled, and more particularly, the mobile device 107 and the vehicle display 128 are understood to be communicatively coupled, as indicated by a double-ended arrow therebetween, representing a communication link therebetween. The communication link may be wired and/or wireless as desired. In general, the controller 165 is also understood to be communicatively coupled to the mobile device 107 and the vehicular computing device 108, and/or, when the controller 165 is a component of the mobile device 107 or vehicular computing device 108, the controller 165 is communicatively coupled to the other of the mobile device 107 and the vehicular computing device 108.

It is further understood that the depicted mobile device 107 comprises one of the mobile devices 107-1, 107-2. For example, it is understood that one of the mobile devices 107 is communicatively coupled with the vehicular computing device 108 and/or may be a primary mobile device 107 that is presently configured to control the vehicle display 128, while the other of the mobile devices 107 is not communicatively coupled with the vehicular computing device 108 and/or may be a secondary mobile device 107 that is not presently configured to control the vehicle display 128. Put another way, the depicted mobile device 107 may be paired with the vehicular computing device 108, while the other mobile device 107 may not be paired with the vehicular computing device 108.

As depicted, the vehicle display 128 is being controlled to provide non-threat related applications 170 which may include, but are not limited to, a map application (e.g., "Maps"), a messaging application (e.g., "Messages"), a calendar application (e.g., "Calendar"), a telephone application (e.g., "Phone"), and the like, as well as a menu navigation application (e.g., "Main Menu"), a settings application (e.g., "Setting"), the time, and the like. As depicted, the non-threat related applications 170 may be provided as icons, which may be actuated to launch a particular non-threat related application 170.

As depicted, the vehicle display 128 is further being controlled to provide a radio application 180, providing radio control information, for example for at least indicating a frequency, channel, zone, and the like, of whichever radio device associated with the vehicle 102 is presently being used to communicate via the wireless link(s) 140. Such a radio device may comprise, or be a component of, the depicted mobile device 107, the other mobile device 107, the vehicular computing device 108, or another radio device (e.g., not depicted, and which may be integrated into the dashboard of the vehicle 102).

As depicted, the mobile device 107 comprises a mobile display 190 and is being controlled to provide a non-threat related application 195 (e.g., or at least not related to the vehicle 102) that, as depicted, comprises an incident application that lists incidents to which first responders associated with the system 100 have been dispatched (e.g., via the dispatch console 132, and the like); such dispatched first responders may include, but are not limited to, the officers 104, 106. For example, as depicted, first responders have been dispatched to investigate a fraud, an animal noise complaint, a citizen assist, and a burglary.

As depicted, the mobile display 190 is further being controlled to provide another instance of the radio application 180. Indeed, the mobile display 190 and the vehicle display 128 may each be controlled to provide a respective instance of the radio application 180, and each instance of the radio application 180 may be similarly updated when radio information associated with the radio application 180 changes. Indeed, the radio application 180 may comprise a widget that provides the depicted radio information, and the like.

As will be described herein with respect to at least FIG. 3, FIG. 4A, FIG. 4B and FIG. 5, when sensor data from the vehicle sensor cluster 120 indicates a threat associated with the vehicle 102, the controller 165 controls the vehicle display 128 and the mobile display 190 to switch to a threat mode.

Attention is next directed to FIG. 2, which depicts a schematic block diagram of an example of a computing device 200, which may comprise the vehicular computing device 108 and/or the mobile device 107 of FIG. 1B, and/or another computing device associated with the vehicle 102 (e.g., which may be internal or external to the vehicle 102) While the computing device 200 is depicted in FIG. 2 as a single component, functionality of the computing device 200 may be distributed among a plurality of components and the like including, but not limited to, any suitable combination of the vehicular computing device 108, the mobile device 107 of FIG. 1B, and the like.

As depicted, the computing device 200 comprises: a communication interface 202, a processing unit 204, a Random-Access Memory (RAM) 206, one or more wireless transceivers 208, one or more wired and/or wireless input/output (I/O) interfaces 210, a combined modulator/demodulator 212, a code Read Only Memory (ROM) 214, a common data and address bus 216, at least one controller 165 (e.g., hereafter the controller 165), and a static memory 220 storing at least one application 222. Hereafter, the at least one application 222 will be interchangeably referred to as the application 222. Furthermore, while the memories 206, 214 are depicted as having a particular structure and/or configuration, (e.g., separate RAM 206 and ROM 214), memory of the computing device 200 may have any suitable structure and/or configuration. Furthermore, functionality of the computing device 200 may in whole or in part, may be distributed, located in cloud computing services or embedded in the controllers within mobile devices 107 and/or vehicular controller 108.

Figure 5:
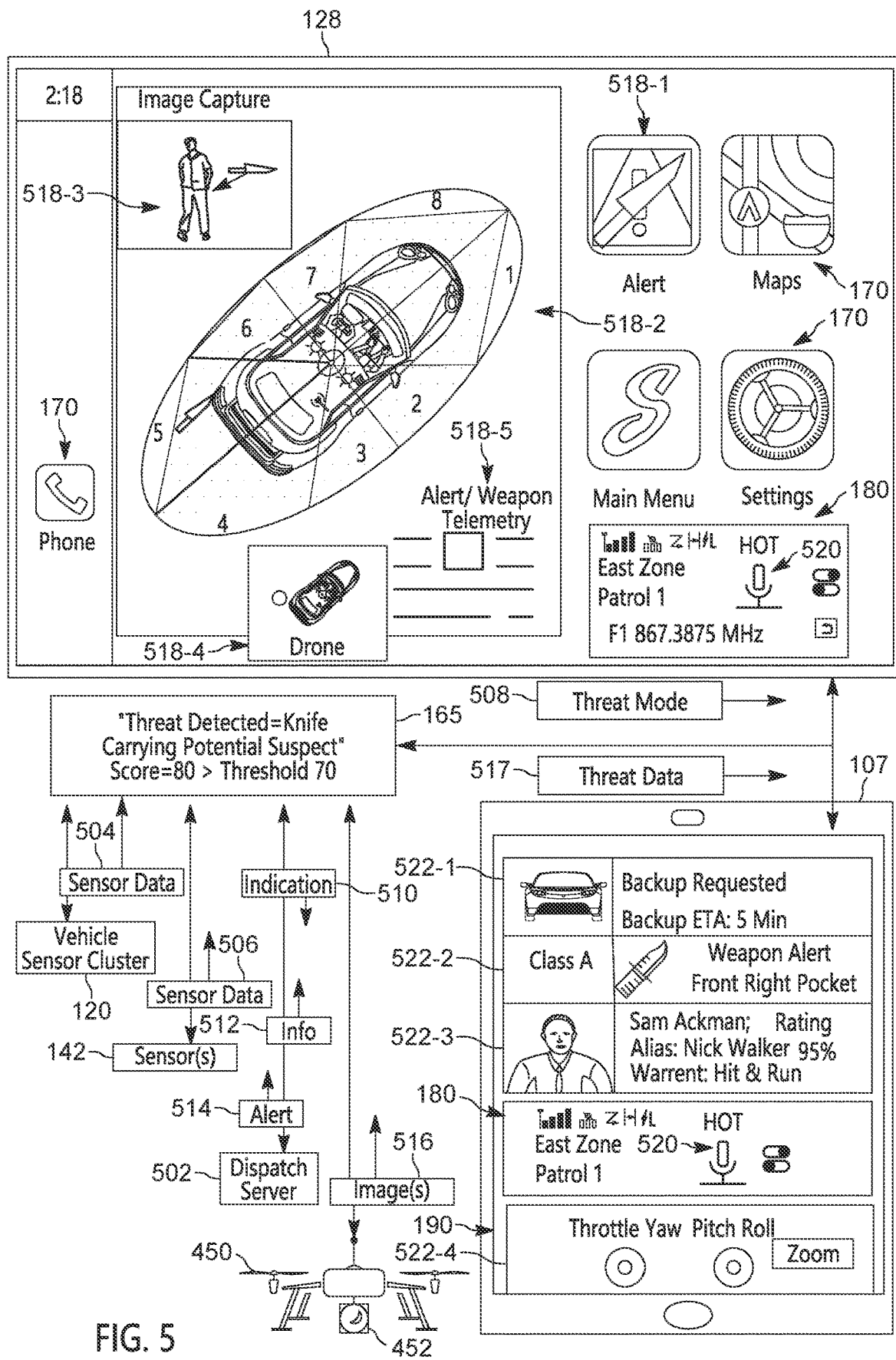
FIG. 5 depicts the displays of FIG. 1B being controlled according to a method for controlling a vehicle display and a mobile display into a threat mode, in accordance with some examples.

Furthermore, the application 222 may include a memory map, and the like, that indicates which indicates data and/or applications (e.g., such as the applications 170, 180, 195 and applications described with respect to FIG. 5) that are to be provided at the displays 128, 190, for example in a non-threat mode and a threat mode.

The application 222 may include programmatic algorithms, and the like, to implement functionality as described herein.

Alternatively, and/or in addition, the application 222 may include one or more machine learning algorithms, which may include, but are not limited to: a deep-learning based algorithm; a neural network; a generalized linear regression algorithm; a random forest algorithm; a support vector machine algorithm; a gradient boosting regression algorithm; a decision tree algorithm; a generalized additive model; evolutionary programming algorithms; Bayesian inference algorithms, reinforcement learning algorithms, and the like. However, any suitable machine learning algorithm and/or deep learning algorithm and/or neural network is within the scope of present examples.

The computing device 200 may include other types of components and/or be communicatively coupled to such other types of components, which may be external or internal to the computing device 200), including, but not limited to one or more display screens 224 (e.g., one or more of the vehicle display 128 and the mobile display 190), one or more speakers 226 (e.g., one or more of the speakers 109, 126, or a speaker of the mobile device 107), one or more microphones 228 (e.g., of the vehicle 102 and/or the mobile device 107), one or more input devices 230 (e.g., touch screens of the display screens 224), one or more location determination devices 232 (for example, a global positioning system (GPS) receiver), and the like.

As shown in FIG. 2, the computing device 200 includes the communication interface 202 communicatively coupled to the common data and address bus 216 of the processing unit 204.

The processing unit 204 may include the code Read Only Memory (ROM) 214 coupled to the common data and address bus 216 for storing data for initializing system components. The processing unit 204 may further include the controller 165 coupled, by the common data and address bus 216, to the Random-Access Memory 206 and the static memory 220.

The communication interface 202 may include one or more wired and/or wireless input/output (I/O) interfaces 210 that are configurable to communicate with other components of the system 100. For example, the communication interface 202 may include one or more transceivers 208 for wirelessly communicating with other suitable components of the system 100. Hence, the one or more transceivers 208 may be adapted for communication with one or more communication links and/or communication networks used to communicate with the other components of the system 100. For example, the one or more transceivers 208 may be adapted for communication with one or more of the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standards (e.g., 802.11a, 802.11b, 802.11g), a 3GPP (3rd Generation Partnership Project) 4G LTE (Long-Term Evolution) network, a 3GPP 5G network (e.g., a network architecture compliant with, for example, the 3GPP TS 23 specification series and/or a new radio (NR) air interface compliant with the 3GPP TS 38 specification series) standard), a Worldwide Interoperability for Microwave Access (WiMAX) network, for example operating in accordance with an IEEE 802.16 standard, and/or other types of GSM (Global System for Mobile communications) and/or another similar type of wireless networks. Hence, the one or more transceivers 208 may include, but are not limited to, a cell phone transceiver, a DMR transceiver, P25 transceiver, a TETRA transceiver, a 3GPP transceiver, a 4G LTE transceiver, a GSM transceiver, a 5G transceiver, a Bluetooth transceiver, a Wi-Fi transceiver, a WiMAX transceiver, and/or another similar type of wireless transceiver configurable to communicate via a wireless radio network.

It is understood that DMR transceivers, P25 transceivers, and TETRA transceivers may be particular to public entity first responders, and hence, in some examples, the system 100 may be operated by a first responder public entity (e.g., such as a police department, a fire department, an emergency medical services department, and the like). In other examples, however, the system 100 may be operated by an enterprise entity, including, but not limited to, business, industrial or utility entities, which, for example, may deploy private first responders to an incident scene (e.g., such as security guards and the like). Put another way, in some examples, the officers 104, 106 may be private first responders.

The communication interface 202 may further include one or more wireline transceivers, such as an Ethernet transceiver, a USB (Universal Serial Bus) transceiver, or similar transceiver configurable to communicate via a twisted pair wire, a coaxial cable, a fiber-optic link, or a similar physical connection to a wireline network.

The transceiver 208 may also be coupled to a combined modulator/demodulator 212.

The controller 165 may include ports (e.g., hardware ports) for coupling to other suitable hardware components of the system 100.

The controller 165 may include one or more logic circuits, one or more processors, one or more microprocessors, one or more GPUs (Graphics Processing Units), and/or the controller 165 may include one or more ASIC (application-specific integrated circuits) and one or more FPGA (field-programmable gate arrays), and/or another electronic device.

In a particular example, the controller 165 may comprise one or more of: an In-Car Processor (ICP) of the vehicle 102; and/or a mobile processor of the mobile device 107 as depicted in FIG. 1B.

In some examples, the controller 165 and/or the computing device 200 is not a generic controller and/or a generic device, but a device specifically configured to implement functionality for controlling a vehicle display and a mobile display into a threat mode. For example, in some examples, the computing device 200 and/or the controller 165 specifically comprises a computer executable engine configured to implement functionality for controlling a vehicle display and a mobile display into a threat mode. In some examples, such a computer executable engine may comprise an ASIC, however, such a computer executable engine may be implemented in any suitable manner.

The static memory 220 comprises a non-transitory machine readable medium that stores machine readable instructions to implement one or more programs or applications. Example machine readable media include a non-volatile storage unit (e.g., Erasable Electronic Programmable Read Only Memory ("EEPROM"), Flash Memory) and/or a volatile storage unit (e.g., random-access memory ("RAM")). In the example of FIG. 2, programming instructions (e.g., machine readable instructions) that implement the functionality of the computing device 200 as described herein are maintained, persistently, at the memory 220 and used by the controller 165, which makes appropriate utilization of volatile storage during the execution of such programming instructions.

Figure 3:
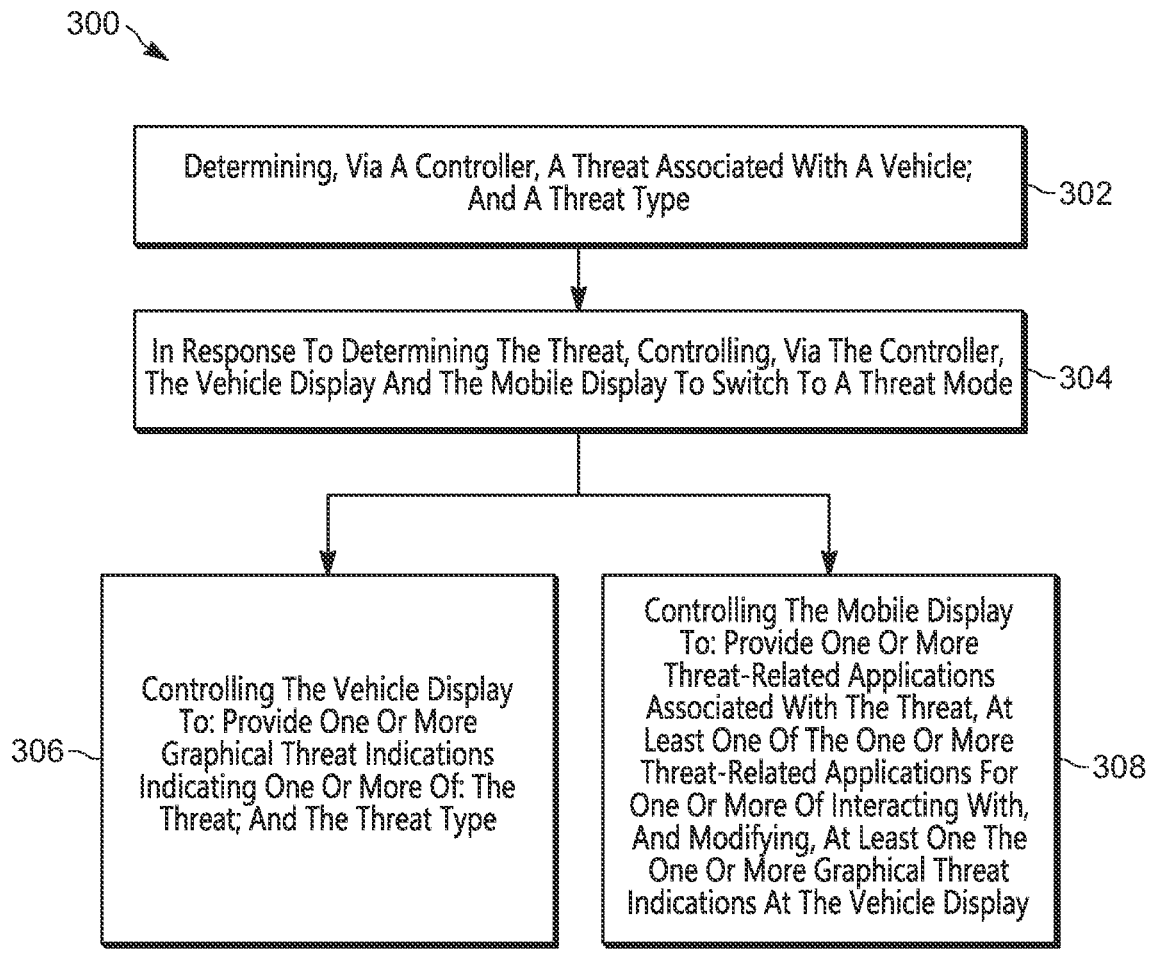
FIG. 3 is a flowchart of a method for controlling a vehicle display and a mobile display into a threat mode, in accordance with some examples.

Regardless, it is understood that the memory 220 stores instructions corresponding to the at least one application 222 that, when executed by the controller 165, enables the controller 165 to implement functionality for controlling a vehicle display and a mobile display into a threat mode, including, but not limited to, the blocks of the method set forth in FIG. 3.

Attention is now directed to FIG. 3, which depicts a flowchart representative of a method 300 for controlling a vehicle display and a mobile display into a threat mode. The operations of the method 300 of FIG. 3 correspond to machine readable instructions that are executed by the computing device 200, and specifically the controller 165 of the computing device 200. In the illustrated example, the instructions represented by the blocks of FIG. 3 are stored at the memory 220 for example, as the application 222. The method 300 of FIG. 3 is one way that the controller 165 and/or the computing device 200 and/or the system 100 may be configured. Furthermore, the following discussion of the method 300 of FIG. 3 will lead to a further understanding of the system 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1A, as well.

At a block 302, the controller 165, and/or the computing device 200, determines a threat associated with the vehicle 102; and a threat type.

In some examples, as depicted in FIG. 3, the threat and/or the threat type may be wholly determined and/or at least partially determined using sensor data from the vehicle sensor cluster 120.

Alternatively or in addition, the threat and/or the threat type may be wholly determined and/or at least partially determined via electronic and/or wireless reception of an incident and/or dispatch alert from the dispatch console 132, and/or some other source configured to notify the controller 165 of a public safety event that may require the assistance of the users 104, 106. In an incident and/or dispatch alert, incident information may be provided that may include the threat and/or threat type, and such incident information may include, but is not limited to, a threat assessment, a threat priority, a threat type, and/or any suitable associated display application that may be used to configure the vehicle and/or mobile device displays 128, 190. Put another way, information and/or applications that may be provided at the displays 128, 190 in a threat mode may be received with an incident and/or dispatch alert; in some of these examples, information and/or applications received with an incident and/or dispatch alert may further be used to update the aforementioned memory map and/or may be received with a command to update the aforementioned memory map.

In some examples, the threat and/or the threat type may be determined from a combination of the sensor data from the vehicle sensor cluster 120 and an incident and/or dispatch alert, for example from the dispatch console 132, and/or any other suitable source.

At a block 304, the controller 165, and/or the computing device 200, in response to determining the threat, controls the vehicle display 128 and the mobile display 190 to switch to a threat mode.

In particular, to control the vehicle display 128 into the threat mode, at a block 306, the controller 165, and/or the computing device 200 controls the vehicle display 128 to: provide a one or more graphical threat indications indicating one or more of: the threat; and the threat type.

The one or more of the one or more graphical threat indications may comprise one or more of: a threat alert indication; a directionality indication; an image of the threat; a telemetry indication; and a drone image indication, amongst other possibilities. Examples of the one or more graphical threat indications are described herein at least with respect to FIG. 5.

In some examples, the method 300 may further include the controller 165, and/or the computing device 200 controlling the in-vehicle display 128 to switch to the threat mode (e.g., at the block 306) by: closing a portion of first non-threat related applications 170 presently provided at the vehicle display 128, or pushing the portion of the first non-threat related applications 170 to a background of the vehicle display 128.

Furthermore, to configure the mobile display 190 of a mobile device 107 into the threat mode, at a block 308, the controller 165, and/or the computing device 200 controls the mobile display 190 to: provide one or more threat-related applications that may be associated with, and/or prioritized for, the threat, at least one of the one or more threat-related applications for one or more of interacting with, and modifying, at least one of one or more graphical threat indications at the in-vehicle display 128.

In further examples, the method 300 may further include the controller 165, and/or the computing device 200, controlling the mobile display 190 to switch to the threat mode (e.g., at the block 308) by: closing a portion of secondary non-prioritized, non-threat related applications 195 presently provided at the mobile display 190, pushing the portion of the secondary non-threat related applications 195 to a background of the mobile display 190, or pushing the secondary non-threat related applications 195 to a background process of the mobile device 107.

The one or more threat-related applications may comprise one or more of: a suspect identifier application; a threat identifier application; a first responder backup application; and a drone control application, amongst other possibilities. Examples of the one or more of the more threat-related applications are described herein at least with respect to FIG. 5.

In particular, the one or more graphical threat indications and/or the one or more threat-related applications may be at least initially provided in a form of respective icons or widgets.

Furthermore, the one or more graphical threat indications and/or the one or more threat-related applications may comprise an actionable response component, which may indicate and/or initiate responses to the threat that may be initiated and/or may have already been automatically initiated, and which may be based on the threat type. Examples of such actionable response components are described herein at least with respect to FIG. 5.

The method 300 may include other features and functions as well.

For example, the method 300 may further include the controller 165, and/or the computing device 200: maintaining the radio application 180, providing radio control information, at one or more of the vehicle display 128 and the mobile display 190 in the threat mode.

Indeed, in some examples, in response to detecting a threat, the method 300 may further include the controller 165, and/or the computing device 200: automatically controlling one or more microphones and one or more speakers associated with a radio of the vehicle 102 (e.g., the microphone 228) into a hot microphone mode, and the radio application 180, may be updated, in the threat mode, to indicate the hot microphone mode. In particular, in the hot microphone mode, one or more microphones and one or more speakers associated with a radio of the vehicle 102 may be turned on, into a hands-free mode so that the officers 104, 106 are provided with hands-free communication. Furthermore, in the hot microphone mode, a radio of the vehicle 102 may be automatically connected to the dispatch console 132, such that, in the hot microphone mode, the officers 104, 106 may be provided with automatic hands-free communication with the dispatch console 132.

In other examples, the method 300 may further include the controller 165, and/or the computing device 200: determining, using the sensor data from the vehicle sensor cluster 120, a directionality of the threat relative to the vehicle 102; and providing, at one or more graphical threat indications, an indication of the directionality. An example of such directionality and the one or more graphical threat indications is described below with respect to FIG. 5.

In other examples, the method 300 may further include the controller 165, and/or the computing device 200: determining (e.g., at the block 302) one or more of the threat, the threat type and a directionality of the threat, relative to the vehicle 102, using the sensor data and external sensor data received from the one or more external sensors 142.

In other examples, the method 300 may further include the controller 165, and/or the computing device 200: assigning a score, such as a threat score, to a determination of the threat (e.g. and the threat score may be an indication of a risk to the users 104, 106; and controlling the vehicle display 128 and the mobile display 190 to switch to the threat mode when the score exceeds a threshold score. For example, when the application 222 comprises one or more machine learning algorithms, such one or more machine learning algorithms may be trained to identify threats (e.g., and threat types, and which may include, but is not limited to, weapons types, facial recognition indicating outstanding felony warrants, and or behavioral analysis indicating ambush preparation) in sensor data from the vehicle sensor cluster 129, and such one or more machine learning algorithms are understood to output machine learning scores of such threats and threat types, for example on a scale of 0 to 100, with 0% being a lowest score indicating, for example, a poor determination of threat (e.g., and a threat type), and 100 being a highest rating score indicating, for example a perfect determination of threat (e.g., and a threat type). A threshold score, such as 60, 70, 80, amongst other possibilities, may be predetermined (e.g., heuristically) and when a machine learning score assigned to a determination of a threat (e.g., and a threat type) exceeds the threshold score, the controller 165, and/or the computing device 200 may control the vehicle display 128 and the mobile display 190 to switch to the threat mode.

In other examples, the method 300 may further include the controller 165, and/or the computing device 200: providing, via the communication interface 202, one or more of the sensor data and an indication of the threat to a dispatch server (e.g., as represented in the present specification by the dispatch console 132 and/or the cloud compute cluster 133); receiving, via the communication interface 202, from the dispatch server, information associated with the threat; and in the threat mode, controlling one or more of the vehicle display 128 and the mobile display 190 to provide the information associated with the threat.

In some examples, the method 300 may further include the controller 165, and/or the computing device 200: receiving, via the communication interface 202, an incident alert; determining that the incident alert is associated with the threat; determining, from the incident alert, respective priorities of the one or more graphical threat indications and the one or more threat-related applications; and controlling the vehicle display 128 and the mobile display 190 to respectively arrange the one or more graphical threat indications and the one or more threat-related applications according to the respective priorities.

Figure 4A:
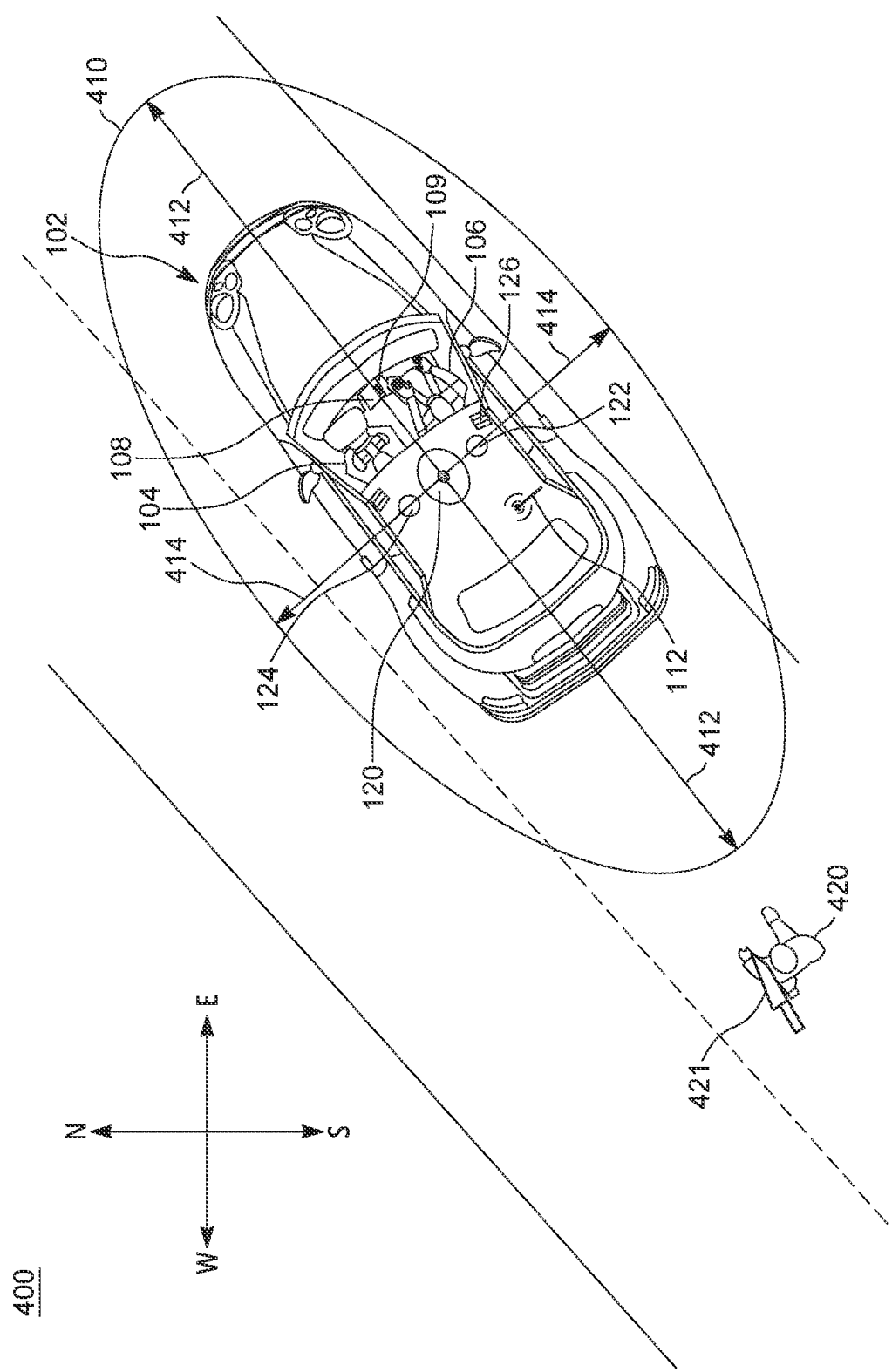
FIG. 4A is a plan view of the system of FIG. 1A, depicting a first example of dynamic perimeter threat detection for a movable vehicle where no threat is yet detected, in accordance with an embodiment.
Figure 4B:
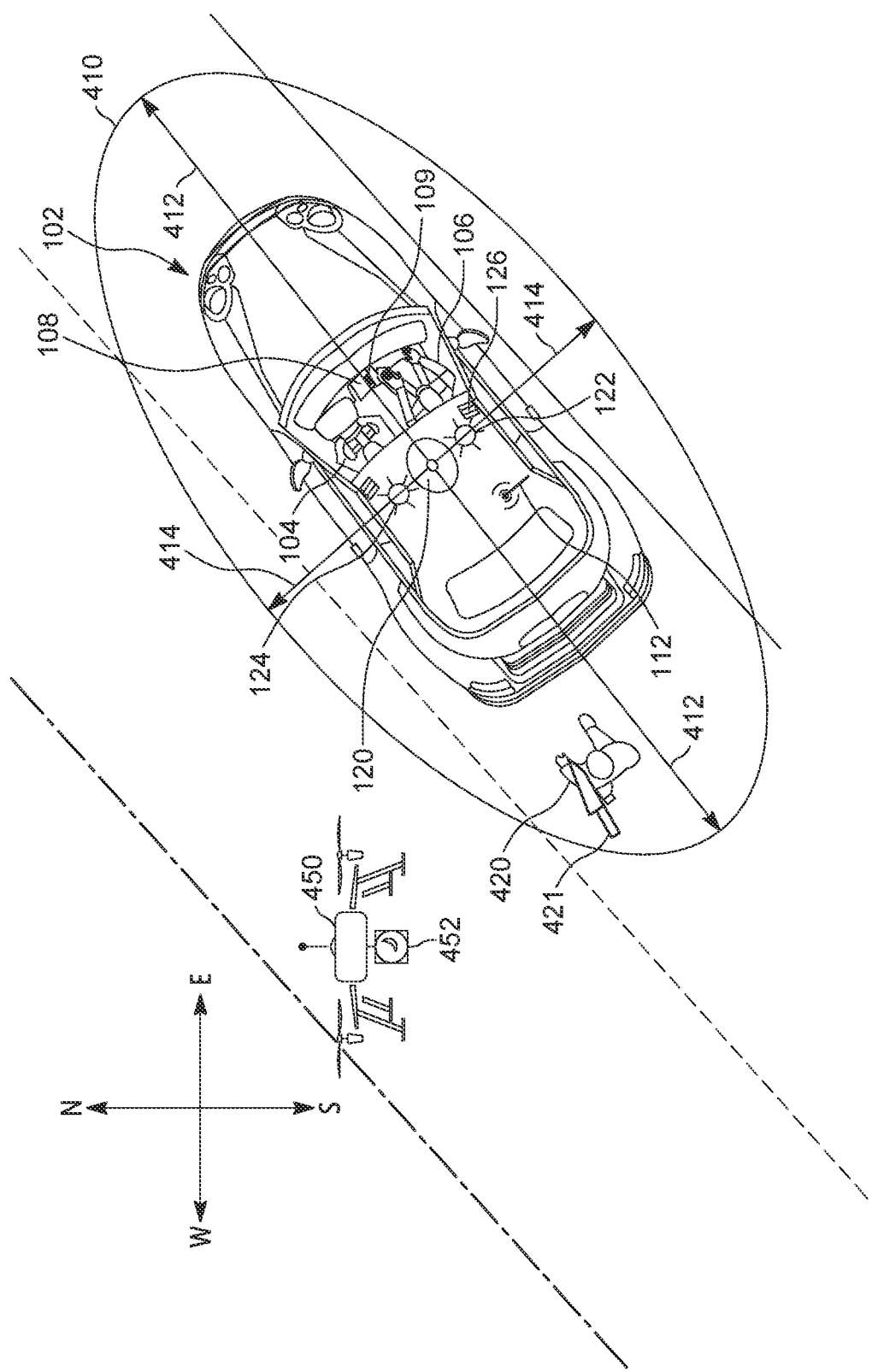
FIG. 4B is a plan view of the system of FIG. 1A, depicting a first example of dynamic perimeter threat detection for a movable vehicle where a threat is detected, in accordance with an embodiment.

Attention is next directed to FIG. 4A and FIG. 4B, which depict an example of a threat associated with vehicle 102 and detecting such a threat.

In particular, FIG. 4A sets forth an example plan view 400 of the vehicle 102 of FIG. 1 and showing a vehicular geofence 410 established using the vehicle sensor cluster 120, having a first perimeter distance 412 having a first value of approximately 10 m measured from vehicle sensor cluster 120 (containing one or more electronic ranging sensors and/or devices as described with respect to FIG. 1A) and having a second perimeter distance 414 having a second value of approximately 5 m measured from vehicle sensor cluster 120. However, the perimeter distances 412, 414 may be of any suitable respective distances.

The resulting oval-shaped vehicular geofence 410 may be monitored, for example, using the vehicle sensor cluster 120 in cooperation with the computing device 200 and/or to identify breaches of the vehicular geofence 410 which may indicate a threat associated with the vehicle 102. For example, as illustrated in FIG. 4A, an unknown human potential suspect 420 is illustrated approaching the vehicle 102 from behind, on a driver's side of the vehicle 102 (e.g., SW in cardinal directions), but has not yet breached the vehicular geofence 410. As depicted, the potential suspect 420 may be carrying a weapon 421 (e.g., a knife, or any other type of weapon) that, while depicted as being visible, may be hidden by the potential suspect 420 in pocket and/or under a jacket, and the like. However the weapon 421 may be detected by the vehicle sensor cluster 120 using any suitable sensor device of the vehicle sensor cluster 120 including, but not limited to, RADAR, SONAR, LiDAR, and the like.

With reference to FIG. 4B, which is understood to follow in time from FIG. 4B, the potential suspect 420 carrying the weapon 421 breaches the vehicular geofence 410 and such a breach may be indicated by sensor data from the vehicle sensor cluster 120.

For example, the vehicle sensor cluster 120 may act as an electronic distancing system that in this example may include at least four displaced visible-light electronic ranging/imaging devices and a RADAR device as described with respect to FIG. 1A, that may detect breach of the vehicular geofence 410 when an object (in this example, the potential suspect 420) crosses the vehicular geofence 410, via either one or both of the electronic ranging/imaging device facing the rear of the vehicle and the RADAR device scanning the entire field of view surrounding the vehicle. Sensor data from such a RADAR device may further indicate a directionality (e.g., a distance from the vehicle 102, and a relative direction from the vehicle 102) of the potential suspect 420 relative to the vehicle 102.

Such sensor data may further indicate the presence of the weapon 421. For example, the controller 165 may receive such sensor data and detect (e.g., at the block 302 of the method 300) the breach and/or the weapon 421 and determine a threat associated with the vehicle 102 and a threat type. For example, as the weapon 421 comprises a knife, the controller 165 may determine that the threat type is a "Knife-Carrying Potential Suspect".

Once the breach and/or threat is detected, the electronic ranging/imaging device portion of the vehicle sensor cluster 120 may capture an image of the potential suspect 420.

Furthermore, as depicted in FIG. 4B, once the breach and/or threat is detected (e.g., by the controller 165), a drone 450, that includes a camera 452, may be launched to monitor the threat. The drone 450 may be launched automatically by the vehicle 102 (e.g., the vehicle 102 may carry the drone 450) and/or, once the breach and/or threat is detected, the dispatch server (e.g., as represented in the present specification by the dispatch console 132 and/or a computing device of the cloud compute cluster 133) may be notified (e.g., by the controller 165 via the communication interface 202), and the dispatch server may launch the drone 450 to support the vehicle 102, as further described herein. While not depicted it is understood that the drone 450 may be in communication with the computing device 200 via a respective wireless link (e.g., with the vehicle 102 and/or the terminal 134), such that images from the camera 452 may be transmitted to the computing device 200 and provided at the in-vehicle display 128, and/or the mobile display 190 in the threat mode, and such that the drone 450 may be controlled via the mobile device 107 and/or another computing device associated with the vehicle 102. For simplicity, the drone 450 is not depicted in a plan view in FIG. 4B.

Attention is next directed to FIG. 5, which depicts an example of aspects of the method 300. FIG. 5 is substantially similar to FIG. 1B, with like components having like numbers. However, FIG. 5 further shows schematically shows the vehicle sensor cluster 120, the one or more external sensors 142, the drone 450, and a dispatch server 502 in communication with the controller 165 via respective communication links (e.g., and which may include one or more of the wireless links 140, 144).

As depicted, the vehicle sensor data is providing sensor data 504 to the controller 165. The controller 165 receives the sensor data 504 (e.g., which may include image data (e.g., of the potential suspect 420), RADAR data, SONAR data (which may indicate the weapon 421 is a knife), LiDAR data, and the like) and determines (e.g., at the block 302 of the method 300) that a threat is approaching the vehicle 102, and a threat type, such as the threat being a knife-type threat and/or a knife carrying potential suspect threat (e.g., as indicated in FIG. 5 via the controller 165 showing "Threat Detected=Knife Carrying Potential Suspect").

Furthermore, a (e.g., threat) score of "80" has been assigned to the determination of the threat and the controller 165 has determined that the score of "80" exceeds a threshold score of "70".

As depicted, the controller 165 is further receiving, from the one or more external sensors 142, respective sensor data 506, such as images of the potential suspect 420, which may also be used by the controller 165 to determine one or more of the threat and a threat type.

It is understood that the controller 165 may implement any suitable analysis and/or video analysis and/or sensor analysis applications when processing the sensor data 504, 506 to determine the threat and/or the threat type, for example using one or more machine learning algorithms, and the like.

In some examples, at least the sensor data 504 from the vehicle sensor cluster 120, and optionally the sensor data 506 from the one or more external sensors 142, may be used by the controller 165 to determine a directionality of the threat (e.g., the potential suspect 420 and/or the weapon 421) relative to the vehicle 102. For example, the controller 165 may determine (e.g., using RADAR data) that the threat (e.g., the potential suspect 420 and/or the weapon 421) is approaching the vehicle 102 from a particular direction.

As depicted, the controller 165, in response to detecting the threat (e.g., and, as depicted, the score exceeding the threshold score), controls (e.g., at the block 304 of the method 300) the vehicle display 128 and the mobile display 190 (e.g., at the block 308 of the method 300) to enter a threat mode by providing one or more commands 508 to the vehicle display 128 and the mobile device 107 to cause the vehicle display 128 and the mobile display 190 to enter the threat mode.

Prior to discussing the threat mode, however, in some examples, as depicted, the controller 165 may further provide (e.g., via the communication interface 202), to the dispatch server 502, an indication 510 of the threat (e.g., such as an image of the potential suspect 420 from the sensor data 504, 506), and receive, in response from the dispatch server 502, information 512 associated with the threat, such as an identifier and/or image of the potential suspect 420, and the like. For example, the dispatch server 502 may receive an image of the potential suspect 420 (e.g., received in the indication 510) and compare the image to a database (not depicted) of suspects using image analysis to match the image of the potential suspect 420 to an image of a suspect from such a database. Hence, the information 512 may comprise a mug shot of the potential suspect 420, and a rating score indicating a success of the match of image of the potential suspect 420 with an image of a suspect from the database (e.g., the rating score being on a scale from 0% to 100%, with 0% being a lowest rating score indicating, for example, no match, and 100% being a highest rating score indicating, for example a perfect match).

As depicted, the controller 165 is further receiving an incident alert 514 from the dispatch server 502, the incident alert 514 indicating an incident (and/or one or more incidents), such as a public safety incident, and the like. The threat described herein may be related to such an incident (e.g., due to the potential suspect 420 also being a suspect in the incident indicated by the incident alert 514). The dispatch server 502 may represent part or all of the cloud compute cluster 133, the dispatch console 132 and the infrastructure control device 130, and the like. Indeed, while the example of FIG. 5 is described with respect the controller 165 determining a threat and a threat type using the sensor data 504, in other examples, the controller 165 may determine a threat and/or a threat type using the sensor data 504 based at least partially (or wholly) on the incident alert 514. For example, the incident alert 514 may indicate that the suspect 420 is in the vicinity of the vehicle 102 and is carrying a weapon, though, in the example of FIG. 5, the sensor data 504 may be used to identify a location of the suspect 420 relative to the vehicle 102. In other examples, however, the various graphical threat indications provided at the vehicle display 128, and/or the threat-related applications provided at the mobile display 190 may be based entirely on the incident alert 514, and/or may trigger the sensor cluster 120 and/or the controller 164 to search for the suspect 420 relative to the vehicle 102 using the sensor data 165.

As depicted, the controller 165 is further receiving images 516 from the drone 450 or, more particularly, from the camera 452 of the drone 450.

As depicted, the controller 165 may further provide, to one or more of the vehicle display 128, and the mobile device 107 and/or the mobile display 190, threat data 517 which may include, but is not limited to, any suitable combination of one or more of the sensor data 504 from the vehicle sensor cluster 120, the sensor data 506 from the one or more external sensors 142, the information 512 and/or the alert 514 from the dispatch server 502, and the images 516 from the drone 450.

Furthermore, the threat data 517 may be separate from the command 508 (e.g., as depicted), or incorporated into the command 508.

It is understood that the command 508 may cause the vehicle display 128 to provide (e.g., at the block 306 of the method 300) one or more graphical threat indications which may provide a particular portion of the information 512, and the command 508 may cause the mobile display 190 to provide (e.g., at the block 308 of the method 300) one or more graphical threat indications which may provide a particular portion of the information 512

In particular, the command 508 may cause the vehicle display 128 to enter the threat mode by providing one or more graphical threat indications indicating one or more of: the threat; and the threat type.

Similarly, the command 508 may cause the mobile display 190 to enter the threat mode by providing one or more threat-related applications associated with the threat for one or more of interacting with, and modifying at least one of the one or more graphical threat indications at the vehicle display 128.

Examples of the graphical threat indication applications at the vehicle display 128 are next described.

For example, as depicted, in the threat mode, the vehicle display 128 has been controlled to include graphical threat indications 518-1, 518-2, 518-3, 518-4, 518-5 (e.g., graphical threat indications 518 and/or a graphical threat indication 518).

The vehicle display 128 has been further controlled (e.g., via the command 508) to close a portion of the first non-threat related applications 170 and/or push the portion of the first non-threat related applications 170 to a background of the vehicle display 128. For example, as depicted, the message and the calendar non-threat related applications 170 have been closed and/or pushed to a background of the vehicle display 128 (e.g., when pushed to a background, such first non-threat related applications 170 may continue to be implemented, but may not be displayed). However the map, menu, settings and phone non-threat related applications 170 continue to be provided.

As depicted, the graphical threat indication 518-1 comprises a threat alert indication, which may be provided in the form of an icon or widget, which indicates presence of a threat (e.g., a triangle with an exclamation mark), and the threat type by way of a graphical icon of a weapon that is particular to the threat. For example, the weapon icon comprises a knife icon. Hence, a graphical threat indication 518 may be dependent on a threat type of a threat that is detected, such that, for example, the graphical threat indication 518-1 includes an icon indicating the threat type. For example, if a gun had been detected, rather than a knife, the weapon icon may comprise a gun icon.

Put another way, the graphical threat indication 518-1 may comprise an icon and/or a widget, for example, which may be based on the threat type; for example, when the threat type is related to a gun, the graphical threat indication 518-1 may include an icon of a gun rather than a knife. Indeed, the graphical threat indication 518-1 may indicate any suitable threat type.

Furthermore, the graphical threat indication 518-1 may, when actuated (e.g., by way of a touch screen of the vehicle display 128) provide, at the vehicle display 128, a status (e.g., an estimated time of arrival) of a requested backup, and the like, and/or may provide any other suitable information and/or backup information. For example, while not depicted, the indication 510 provided to the dispatch server 502 may cause the dispatch server 502 to dispatch other first responders to the vehicle 102. As such, it is understood that the indication 510 may include location coordinates, and the like, as determined by a location determination device of the vehicle 102 (and/or one or more of the mobile devices 107).

Hence, the graphical threat indication 518-1 may also be an indication of an actionable response component, which may indicate and/or initiate responses to the threat that may be initiated and/or may have already been automatically initiated, and which may be based on the threat type. For example, alternatively, when the graphical threat indication 518-1 is actuated, backup may be requested from the dispatch server 502 and/or backup information of a backup already dispatched may be provided at the graphical threat indication 518-1, for example by expanding the graphical threat indication 518-1 at the vehicle display 128 to show such information. Such expansion, and the like, may be controlled via an associated threat-related application of the mobile display 190.

The graphical threat indication 518-2 comprises a directionality indication comprising a graphical depiction of a top view of the vehicle 102, divided into eight quadrants and/or regions, each covering about 45° from a center of the vehicle 102 (e.g., and/or a center of the vehicle sensor cluster 120), and extending to the edges of the geofence 410, to cover 360° around the vehicle 102. The quadrants and/or regions and/or regions are numbered "1" to "8" for clarity. As depicted, a direction of the threat, and a type of the threat are indicated by way of a weapon icon (e.g., a knife icon) located in the fifth quadrant and/or region, the fifth quadrant and/or region being drawn in heavy lines, relative to the other quadrants and/or regions, to indicate that a weapon (e.g., a knife) was detected in the fifth quadrant and/or region; however such a graphic indication of the quadrant or region where the threat is located may be provided in any suitable manner. The fifth quadrant and/or region corresponds to the position of the potential suspect 420 as seen in FIG. 4B. The presence or absence of the heavy lines, and/or graphic indication, and the like, may be controlled via an associated threat-related application of the mobile display 190.

Hence, the graphical threat indication 518-2 may be at least partially based on the threat type, similar to the graphical icon of the graphical threat indication 518-1.

Furthermore, the graphical threat indication 518-2 may, when actuated (e.g., by way of a touch screen of the vehicle display 128) may provide, at the vehicle display 128, further detail of the threat, and the like, such as a location of the weapon 421 at the potential suspect 420, as detected by the vehicle sensor cluster 120, and the like. The providing of such further detail of the threat, and the like, may be controlled via an associated threat-related application of the mobile display 190.

Hence, the graphical threat indication 518-2 may also be an indication of an actionable response component, which in this instance, when actuated, may show more detail of the threat, and the like, such as a location of the weapon 421 at the potential suspect 420, as detected by the vehicle sensor cluster 120, and the like, which may be used by an officer 104, 106 in managing the potential suspect 420.

The graphical threat indication 518-3 may comprise an image of the threat and in particular, an image of the potential suspect 420 as acquired in the sensor data 504. The image of the potential suspect 420 may or may not, however, indicate a threat type (e.g., as the image does not show the weapon 421). In some examples, as depicted, a weapon icon (e.g., such as a knife icon) may be provided with an arrow showing a location of a detected weapon.

Hence, the graphical threat indication 518-3 may be based on the threat type, for example at least when showing the weapon icon (e.g., which may be optional).

Indeed, the graphical threat indication 518-3 (e.g., the image and/or the weapon icon) may be an example of an actionable response component, with at least the weapon icon being at least partially based on the threat type, similar to the graphical icon of the graphical threat indication 518-1, and which may be used by an officer 104, 106 in managing the potential suspect 420.

Furthermore, the graphical threat indication 518-3 may, when actuated (e.g., by way of a touch screen of the vehicle display 128) provide, at the vehicle display 128, more detail of the threat, and the like, for example by at least temporarily expanding the image to fill a larger portion of the vehicle display 128, for example to show a face of the potential suspect 420. The providing of such further detail of the threat, and the like, may be controlled via an associated threat-related application of the mobile display 190.

The graphical threat indication 518-4 may comprise a drone image indication comprising images 516 acquired by the camera 452 of the drone 450 and/or images 516 of video streamed from the camera 452 of the drone 450 (e.g., streaming video); as such the images 516 of the graphical threat indication 518-4 shows the vehicle 102 and the potential suspect 420 from overhead.

The images 516 of the graphical threat indication 518-4 may or may not, however, indicate a threat type (e.g., as the images 516 of the graphical threat indication 518-4 do not show the weapon 421). In some examples, not depicted, a weapon icon (e.g., such as a knife icon) may be provided with an arrow showing a location of a detected weapon, similar to that of the graphical threat indication 518-3. Indeed, the images 516 of the graphical threat indication 518-4 (and/or the weapon icon) may also be an example of an actionable response component.

For example, the graphical threat indication 518-4 may, when actuated (e.g., by way of a touch screen of the vehicle display 128) provide, at the vehicle display 128, more detail of the threat, and the like, for example by at least temporarily expanding the images 516 of the graphical threat indication 518-4 to fill a larger portion of the vehicle display 128. The providing of such further detail of the threat, and the like, may be controlled via an associated threat-related application of the mobile display 190.

The graphical threat indication 518-5 may comprise a telemetry indication, that indicates the threat and/or a type of threat via a textual label of "weapon telemetry". Furthermore, the graphical threat indication 518-5 may, when actuated (e.g., by way of a touch screen of the vehicle display 128) provide, at the vehicle display 128, more detail of the telemetry of the threat, and the like, for example by at least temporarily showing a trajectory of the threat as detected, over time, by the vehicle sensor cluster 120. Indeed, the telemetry of the threat may be an example of an actionable response component, with at least the telemetry of the threat being at least partially based on the threat type, showing, for example, the trajectory of the weapon 421 by way of a weapon icon, and the like.

In some examples, the telemetry application may show a predicted trajectory of the threat based, for example, on the determined trajectory of the threat, and such a predicted trajectory may be provided when the graphical threat indication 518-5 is actuated. The providing of the trajectory and/or the predicted trajectory of the threat, and the like, may be controlled via an associated threat-related application of the mobile display 190.

As depicted, the radio application 180 is maintained at the vehicle display 128. However, in some examples, as depicted, the controller 165, upon detecting the threat, may responsively place microphone and speakers associated with the vehicle 102 into a hot-microphone mode, and the radio application 180 may include an indication 520 of such a hot-microphone mode (e.g., as depicted, via a microphone icon and the text "HOT").

Attention is next directed to the mobile display 190. For example, as depicted, in the threat mode, the mobile display 190 has been controlled to include threat-related applications 522-1, 522-2, 522-3, 522-4 (e.g., threat-related applications 522 and/or a threat-related applications 522) associated with the threat. One or more of the threat-related applications 522 may be generally for one or more of interacting with, and modifying one or more of graphical threat indications 518 at the vehicle display 128.

The mobile display 190 has been further controlled (e.g., via the command 508) to close a portion of the second non-threat related applications 195, and/or push the portion of the second non-threat related applications 195 to a background of the mobile display 190, and/or push the portion of the second non-threat related applications 195 to a background process of the mobile device 107. For example, as depicted, the incident non-threat related application 195 has been closed and/or pushed to a background and/or a background process.

However, the instance of radio application 180 is maintained at the mobile display 190, and also includes the indication 520 of the hot-microphone mode.

As depicted, the threat-related application 522-1 comprises a first responder backup application which indicates that a backup has been automatically requested, along with an estimated time of arrival (ETA) of the backup. For example, as previously described, the indication 510 provided to the dispatch server 502 may cause the dispatch server 502 to dispatch other first responders to the vehicle 102 and the dispatch server 502 may further provide the ETA to the controller 165.

Alternatively, or in addition, backup may not be automatically dispatched, and the threat-related application 522-1 may be used to request such backup.

Furthermore, the threat-related application 522-1 may be associated with the graphical threat indication 518-1 such that, when the threat-related application 522-1 is actuated (e.g., via a touch screen of the mobile display 190) at the mobile display 190, the graphical threat indication 518-1 is expanded at the vehicle display 128 to show the backup information.

As depicted, the threat-related application 522-2 comprises a threat identifier application which indicates a type of the threat (e.g., via the text "Weapon Alert", a classification of the weapon as "Type A", and such classifications may be programmed into the application 222, and an icon corresponding to the threat type, such as a knife icon). The threat-related application 522-2 further indicates a location of a weapon of the threat, via the text "Front Right Pocket", as determined from the sensor data 504.

Furthermore, the threat-related application 522-2 may be associated with the graphical threat indication 518-2 such that, when the threat-related application 522-2 is actuated (e.g., via a touch screen of the mobile display 190) at the mobile display 190, a location of the threat may be highlighted in the directionality indication. For example, a visual appearance of the quadrant and/or region that includes the threat (e.g., quadrant "5") may be changed at the vehicle display 128 in any suitable manner, including, but not limited to, turning on the depicted bold lines, changing a color of the quadrant, causing the quadrant to flash, and the like. Alternatively, or in addition, a visual appearance of the weapon icon may be changed at the vehicle display 128 in any suitable manner, including, but not limited to, placing an outline around the weapon icon, changing a color of the weapon icon, causing the weapon icon to flash, and the like.

As depicted, the threat-related application 522-3 comprises a suspect identifier application which may be based on the information 512 and/or the alert 514. For example, as depicted, the suspect identifier application comprises an image of the suspect from the aforementioned database that was matched with an image in the indication 510 and/or the sensor data 504 and/or the sensor data 506. Alternatively, or in addition, the suspect identifier application comprises an image of a suspect of the alert 514 that was matched with an image in the indication 510 and/or the sensor data 504 and/or the sensor data 506.

The suspect identifier application further includes a name (e.g., "Sam Ackman") and an alias (e.g., "Nick Walker") of the potential suspect 420, for example as received in the information 512 and/or the alert 514, along with an indication of an incident (e.g., "Hit & Run") with which the potential suspect 420 may be associated, as well as indication that a "Warrant" for the suspect has been issued. The suspect identifier application further includes the aforementioned rating score (e.g., "Rating") indicating that there is a "95%" chance that the potential suspect 420 matches the suspect identified in the suspect identifier application.

Furthermore, the threat-related application 522-3 may be associated with the graphical threat indication 518-3 such that, when the threat-related application 522-3 is actuated (e.g., via a touch screen of the mobile display 190) at the mobile display 190, the image of the potential suspect 420 shown in the graphical threat indication 518-3 may be expanded to show a face of the potential suspect 420, so that an officer 104, 106 may perform a visual comparison between the face of the potential suspect 420 and the face of the suspect shown in the threat-related application 522-3.

As depicted, the threat-related application 522-4 comprises a drone control application for controlling the drone 450. The drone control application (e.g., a drone interface) includes controls to control throttle, pitch, yaw and roll of the drone and zoom of the camera 452. When the drone 450 has not yet already been deployed, the drone controls may include a drone launch control, that, when actuated, causes the drone 450 to be launched from a location where the drone 450 is initially located; similarly, while not depicted, the drone controls may include a drone return control, that, when actuated, causes the drone 450 to return to the location from which the drone 450 was launched.

Furthermore, the threat-related application 522-4 may be associated with the graphical threat indication 518-4 such that, when the threat-related application 522-4 is actuated (e.g., via a touch screen of the mobile display 190) at the mobile display 190, the images from the drone camera 452 changes accordingly as the drone 450 moves and/or zoom of the camera 452 is controlled.

Alternatively, or in addition, the threat-related application 522-4 may provide controls for providing further detail of the threat, and the like, such as expanding images from the drone camera 452 to show a face of the potential suspect in the drone may be controlled via an images from the drone camera 452.

While control of the graphical threat indication 518-5 via an associated threat-related application 522 is not described herein, any suitable threat-related application 522 may be used to interact with and/or modify the graphical threat indication 518-5. For example, actuation of the threat-related application 522-2 may also cause the graphical threat indication 518-5 to show the aforementioned trajectory and/or predicted trajectory of the threat.

It is furthermore understood that the graphical threat indications 518 and/or the threat-related application 522 may be respectively arranged at the vehicle display 128 and the mobile display 190 according to respective priorities assigned to the graphical threat indications 518 and/or the threat-related application 522 based, for example, on the incident alert 514 and/or the threat type.

For example, the incident alert 514 and/or the threat type may indicate that the potential suspect 420 is dangerous and hence, at the vehicle display 128, the directionality graphical threat indication 518-2 may be provided (e.g., as depicted) larger than the other graphical threat indications 518 so that a location of the potential suspect 420 and/or the threat, relative to the vehicle 102, may be shown larger than the information provided by the other graphical threat indications 518.

Similarly, the graphical threat indications 518 may be arranged accordingly, for example around the directionality graphical threat indication 518-2, according to any suitable scheme. In particular, higher priority may be assigned to graphical threat indications 518 showing images of the potential suspect 420 and backup information, and, in one scheme, higher priority graphical threat indications 518, such as the graphical threat indications 518-1, 518-3, may be arranged (e.g., by the controller 165) at a top of the vehicle display 128, and lower priority graphical threat indications 518, such as the graphical threat indications 518-4, 518-5 may be arranged (e.g., by the controller 165) at a bottom of the vehicle display 128.

Furthermore, the controller 165 may arrange the graphical threat indications 518 such that the graphical threat indications 518 do not overlap and/or such that the graphical threat indications 518 that do overlap do not obscure each other's rendered information. For example, while the graphical threat indications 518-1, 518-3 overlap, they do not obscure each other's rendered information.

Similarly, the threat-related applications 522 may be arranged according to a priority and/or the threat type. For example, as depicted, higher priority threat-related applications 522 are arranged from top to bottom at the mobile display 190. In particular, the backup threat-related application 522-1 at the top of the mobile display 190 is assigned a higher priority than the weapon alert threat-related application 522-2, which is second from the top, though both may have similar priorities and any suitable scheme may be used to resolve which is at the top, and which is second from the top. As depicted, the drone control threat-related application 522-4 is provided at the bottom of the mobile display 190 (e.g., after even the radio application 180) due to ease of use of operating the drone controls in such a location.

Indeed, when the threat type is different, the priorities of the graphical threat indications 518 and/or the threat-related applications 522 may be different, with the graphical threat indications 518 and/or the threat-related applications 522 arranged differently at the vehicle display 128 and the mobile display 190.

For example, the threat and the threat type may comprise a barking dog, and in such an example, the graphical threat indication 518-3 showing the barking dog may be larger at the vehicle display 128 than the graphical threat indications 518.

Similarly, different priorities may be assigned based on the incident alert 514. For example, when the potential suspect 420 may be wanted for murder, the suspect identifier threat-related application 522-3 may be assigned a higher priority than the other threat-related applications 522, and the suspect identifier threat-related application 522-3 may be rendered at a top of the mobile display 190.

Similarly, the respective types of graphical threat indications 518 and/or the threat-related applications 522 that are provided may depend on the threat type. For example, at the application 222, different graphical threat indications 518 and threat-related applications 522 may be mapped to different threat types, and only those graphical threat indications 518 and threat-related applications 522 mapped to a detected threat type may be provided at the vehicle display 128 and the mobile display 190 when the threat type is detected. For example, when the threat is a barking dog, the drone 450 may not be launched, and the graphical threat indication 518-4 and the threat-related application 522-4 may not be provided. Indeed, in such an example, the weapon icon described throughout may be changed to a dog icon, and the like. Similarly, the suspect identifier threat-related application 522-3 may not be launched when the threat is a barking dog.

Other examples are within the scope of the present specification. For example, one or more of the graphical threat indications 518 and the threat-related applications 522 may be related to identifying and/or selecting proximal cameras of the external sensors 142 and providing streaming images and/or video from selected cameras at one or more of the vehicle display 128 and the mobile display 190. In another example, one or more of the graphical threat indications 518 and the threat-related applications 522 may be related to releasing a dog carried by the vehicle 102 (e.g., a "K9" unit), and providing streaming images and/or video from a camera worn by such a dog at one or more of the vehicle display 128 and the mobile display 190.

As should be apparent from this detailed description above, the operations and functions of electronic computing devices described herein are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, cannot control displays, cannot arrange identifiers and/or applications at a display, and the like).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together). Similarly the terms "at least one of" and "one or more of", without a more limiting modifier such as "only one of", and when applied herein to two or more subsequently defined options such as "at least one of A or B", or "one or more of A or B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context, in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

Furthermore, descriptions of one processor and/or controller and/or device and/or engine, and the like, configured to perform certain functionality is understood to include, but is not limited to, more than one processor and/or more than one controller and/or more than one device and/or more than one engine, and the like performing such functionality.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system comprising:
a vehicle display of a vehicle; and
a mobile device communicatively coupled to the vehicle, the mobile device comprising: a mobile display; and
a controller, wherein the controller comprises a processor, the controller configured to:
determine a threat associated with the vehicle; and a threat type; and
in response to determining the threat, control the vehicle display and the mobile display to switch to a threat mode by:
controlling the vehicle display to:
provide one or more graphical threat indications indicating one or more of: the threat; and the threat type; and
controlling the mobile display to:
provide one or more threat-related applications associated with the threat, at least one of the one or more threat-related applications for one or more of interacting with, and modifying, at least one of the one or more graphical threat indications at the vehicle display.

2. The system of claim 1, wherein the controller is further configured to further control the vehicle display to switch to the threat mode by:
closing a portion of first non-threat related applications presently provided at the vehicle display, or pushing the portion of the first non-threat related applications to a background of the vehicle display.

3. The system of claim 1, wherein the controller is further configured to further control the mobile display to switch to the threat mode by:
closing a portion of second non-threat related applications presently provided at the mobile display, pushing the portion of the second non-threat related applications to a background of the mobile display, or pushing the portion of second non-threat related applications to a background process of the mobile device.

4. The system of claim 1, further comprising a vehicle sensor cluster and the controller is further configured to:
determine, using sensor data from the vehicle sensor cluster, a directionality of the threat relative to the vehicle; and
provide, at the one or more graphical threat indications, an indication of the directionality.

5. The system of claim 1, further comprising a vehicle sensor cluster and the controller is further configured to:
determine one or more of the threat, the threat type and a directionality of the threat, relative to the vehicle, using sensor data from the vehicle sensor cluster and external sensor data received from one or more external sensors.

6. The system of claim 1, wherein the controller is further configured to:
assign a score to a determination of the threat; and
control the vehicle display and the mobile display to switch to the threat mode when the score exceeds a threshold score.

7. The system of claim 1, further comprising a vehicle sensor cluster and a communication interface, and the controller is further configured to:
provide, via the communication interface, one or more of sensor data from the vehicle sensor cluster and an indication of the threat to a dispatch server;
receive, via the communication interface, from the dispatch server, information associated with the threat; and
in the threat mode, control one or more of the vehicle display and the mobile display to provide the information associated with the threat.

8. The system of claim 1, wherein a radio application, providing radio control information, is maintained at one or more of the vehicle display and the mobile display in the threat mode.

9. The system of claim 1, further comprising a communication interface, and wherein the controller is further configured to:
receive, via the communication interface, an incident alert;
determine that the incident alert is associated with the threat;
determine, from the incident alert, respective priorities of the one or more graphical threat indications and the one or more threat-related applications; and,
control the vehicle display to arrange the one or more graphical threat indications and the one or more threat-related applications according to the respective priorities.

10. The system of claim 1, wherein the one or more graphical threat indications comprise one or more of:

a threat alert indication;
a directionality indication;
an image of the threat;
a telemetry indication; and
a drone image indication.

11. The system of claim 1, wherein the one or more threat-related applications comprise one or more of:
a suspect identifier application;
a threat identifier application;
a first responder backup application; and
a drone control application.

12. The system of claim 1, wherein the controller comprises one or more of:
an In-Car Processor (ICP) of the vehicle; and
a mobile processor of the mobile device.

13. The system of claim 1, wherein the one or more graphical threat indications and the one or more threat-related applications are at least initially provided in a form of respective icons or widgets.

14. A method comprising:
determining, via a computing device, a threat associated with a vehicle; and a threat type, wherein the computing device comprises a processor; and
in response to determining the threat, controlling, via the computing device, a
vehicle display, of the vehicle, and a mobile display, of a mobile device communicatively coupled to the vehicle, to switch to a threat mode by:
controlling the vehicle display to: provide one or more graphical threat indications indicating one or more of:
the threat; and the threat type; and
controlling the mobile display to: provide one or more threat-related applications associated with the threat, at least one of the one or more threat-related applications for one or more of interacting with, and modifying, at least one of the one or more graphical threat indications at the vehicle display.

15. The method of claim 14, wherein controlling the vehicle display to switch to the threat mode comprises:
closing a portion of first non-threat related applications presently provided at the vehicle display, or pushing the portion of the first non-threat related applications to a background of the vehicle display.

16. The method of claim 14, wherein controlling the mobile display to switch to the threat mode comprises:
closing a portion of second non-threat related applications presently provided at the mobile display, pushing the portion of the second non-threat related applications to a background of the mobile display, or pushing the portion of second non-threat related applications to a background process of the mobile device.

17. The method of claim 14, wherein the vehicle further comprises a vehicle sensor cluster, and the method further comprises:
determining, using sensor data from the vehicle sensor cluster, a directionality of the threat relative to the vehicle; and
providing, at the one or more graphical threat indications, an indication of the directionality.

18. The method of claim 14, wherein the vehicle further comprises a vehicle sensor cluster, and the method further comprises:
determining one or more of the threat, the threat type and a directionality of the threat, relative to the vehicle, using sensor data from the vehicle sensor cluster and external sensor data received from one or more external sensors.

19. The method of claim 14, further comprising:
assigning a score to a determination of the threat; and
controlling the vehicle display and the mobile display to switch to the threat mode when the score exceeds a threshold score.

20. The method of claim 14, wherein the vehicle further comprises a vehicle sensor cluster and a communication interface, and the method further comprises:
providing, via the communication interface, one or more of sensor data from the vehicle sensor cluster and an indication of the threat to a dispatch server;
receiving, via the communication interface, from the dispatch server, information associated with the threat; and
in the threat mode, controlling one or more of the vehicle display and the mobile display to provide the information associated with the threat.

* * * * *